(12) United States Patent
Stewart

(10) Patent No.: US 10,478,879 B2
(45) Date of Patent: *Nov. 19, 2019

(54) EXTRUSION PRESS SYSTEMS AND METHODS

(71) Applicant: Manchester Copper Products, LLC, Rockledge, FL (US)

(72) Inventor: Charles L. Stewart, Indialantic, FL (US)

(73) Assignee: Manchester Copper Products, LLC, Rockledge, FL (US)

( * ) Notice: Subject to any disclaimer, the term of this patent is extended or adjusted under 35 U.S.C. 154(b) by 805 days.

This patent is subject to a terminal disclaimer.

(21) Appl. No.: 15/154,019

(22) Filed: May 13, 2016

(65) Prior Publication Data
US 2016/0325328 A1    Nov. 10, 2016

Related U.S. Application Data

(62) Division of application No. 13/650,977, filed on Oct. 12, 2012, now Pat. No. 9,346,089.

(51) Int. Cl.
*B21C 23/21* (2006.01)
*B29C 31/00* (2006.01)
(Continued)

(52) U.S. Cl.
CPC .......... *B21C 23/212* (2013.01); *B21C 23/001* (2013.01); *B21C 25/02* (2013.01);
(Continued)

(58) Field of Classification Search
CPC ... B21C 23/085; B21C 23/211; B21C 23/215; B21C 23/217; B21C 23/212;
(Continued)

(56) References Cited

U.S. PATENT DOCUMENTS

| 411,060 A | 9/1889 | Robertson |
| 2,002,966 A | 5/1935 | Sparks |

(Continued)

FOREIGN PATENT DOCUMENTS

| CH | 611549 A5 | 6/1979 |
| DE | 419859 C | 10/1925 |

(Continued)

OTHER PUBLICATIONS

International Search Report and Written Opinion dated Jan. 20, 2014 for PCT/US2013/064558.

(Continued)

*Primary Examiner* — Gregory D Swiatocha
(74) *Attorney, Agent, or Firm* — Haley Guiliano LLP; Jeffrey H. Ingerman; Jason S. Ingerman

(57) ABSTRACT

One or more hollow billets are loaded onto an elongate mandrel bar for extrusion. The billets are transported along the mandrel bar to a rotating die. The billets are transported through fluid clamps, which engage the mandrel bar and provide cooling fluid to the mandrel bar tip, and through mandrel grips, which engage the mandrel bar and prevent the mandrel bar from rotating. One or more press-rams advance the billets through a centering insert and into the rotating die. A quench assembly is provided at an extrusion end of the extrusion press to quench the extruded material. A programmable logic controller may be provided to control, at least in part, operations of the extrusion press system.

17 Claims, 33 Drawing Sheets

(51) Int. Cl.
*B21C 33/00* (2006.01)
*B21C 23/00* (2006.01)
*B21C 25/02* (2006.01)
*B21C 25/04* (2006.01)
*B21C 29/02* (2006.01)
*B21C 29/04* (2006.01)
*B21C 35/02* (2006.01)

(52) U.S. Cl.
CPC .............. *B21C 25/04* (2013.01); *B21C 29/02* (2013.01); *B21C 29/04* (2013.01); *B21C 33/006* (2013.01); *B21C 35/023* (2013.01); *B29C 31/002* (2013.01)

(58) Field of Classification Search
CPC ......... B21C 23/04; B21C 26/00; B21C 29/04; B21C 23/001; B21C 25/02; B21C 25/04; B21C 29/02; B21C 29/003; B21C 33/006; B21C 35/023; B21C 31/00; B21C 31/002; C21D 1/62
USPC .... 72/257, 264–266, 270, 273, 253.1, 273.5
See application file for complete search history.

(56) References Cited

U.S. PATENT DOCUMENTS

| | | | |
|---|---|---|---|
| 2,057,467 A | 10/1936 | Williams | |
| 2,596,552 A * | 5/1952 | Heinrich | B21C 25/02 29/33 D |
| 2,698,683 A | 1/1955 | Martin et al. | |
| 2,713,418 A * | 7/1955 | Kent | B21C 23/21 72/270 |
| 2,728,453 A | 12/1955 | Hardin et al. | |
| 2,929,499 A | 3/1960 | Turner | |
| 2,988,211 A | 6/1961 | Kent et al. | |
| 3,113,676 A * | 12/1963 | Harkenrider | B21C 33/00 72/270 |
| 3,260,095 A | 7/1966 | Flanagan | |
| 3,355,927 A | 5/1967 | Guenter | |
| 3,422,493 A | 1/1969 | Heston | |
| 3,455,137 A * | 7/1969 | Edgecombe | B21C 23/085 72/264 |
| 3,541,831 A * | 11/1970 | Simonton | B21C 25/04 72/253.1 |
| 3,585,832 A | 6/1971 | Hinshaw et al. | |
| 3,640,656 A | 2/1972 | Boguslawski | |
| 3,798,954 A | 3/1974 | Asari | |
| 3,922,898 A * | 12/1975 | Voorhes | B21C 23/005 72/262 |
| 4,053,274 A | 10/1977 | Lemelson | |
| 4,154,081 A | 5/1979 | Boshold | |
| 4,178,982 A | 12/1979 | Sevastakis | |
| 4,192,162 A * | 3/1980 | Zilges | B21C 23/085 72/38 |
| 4,208,897 A | 6/1980 | Akeret | |
| 4,223,548 A | 9/1980 | Wagner et al. | |
| 4,242,897 A | 1/1981 | Ahmed et al. | |
| 4,300,378 A * | 11/1981 | Thiruvarudchelvan | B21C 3/12 72/253.1 |
| 4,316,373 A | 2/1982 | Zilges et al. | |
| 4,399,676 A | 8/1983 | Noyori et al. | |
| 4,528,832 A * | 7/1985 | Fuchs, Jr. | B21C 23/005 156/244.14 |
| 4,606,211 A * | 8/1986 | Noyori | B21C 33/00 72/270 |
| 4,817,411 A | 4/1989 | Bennett et al. | |
| 4,825,677 A | 5/1989 | Bessey et al. | |
| 5,022,252 A | 6/1991 | Wellman et al. | |
| 5,178,814 A | 1/1993 | Lemond | |
| 5,188,676 A | 2/1993 | Taylor | |
| 5,473,925 A * | 12/1995 | Yano | B21C 23/005 72/262 |
| 5,505,887 A | 4/1996 | Zdrahala et al. | |
| 5,572,894 A | 11/1996 | Yano | |
| 5,595,085 A * | 1/1997 | Chen | B21C 23/217 72/255 |
| 5,600,900 A | 2/1997 | Marschke | |
| 5,666,846 A | 9/1997 | Chen et al. | |
| 5,678,442 A | 10/1997 | Ohba et al. | |
| 5,687,604 A | 11/1997 | Robbins | |
| 5,823,038 A | 10/1998 | Jakoby | |
| 5,874,032 A | 2/1999 | Zdrahala et al. | |
| 5,964,120 A | 10/1999 | Iwase et al. | |
| 6,158,999 A | 12/2000 | Hartman et al. | |
| 6,418,732 B1 | 7/2002 | Klane et al. | |
| 6,814,561 B2 | 11/2004 | Venditti et al. | |
| 7,017,352 B2 | 3/2006 | Hutchison et al. | |
| 7,173,524 B2 | 2/2007 | Ponziani | |
| 7,448,245 B2 | 1/2008 | Muschalik et al. | |
| 7,591,163 B2 | 9/2009 | Yamamoto | |
| 9,163,718 B2 | 10/2015 | Nelson | |
| 9,545,653 B2 | 1/2017 | Stewart | |
| 2002/0029601 A1 | 3/2002 | Kwok | |
| 2004/0055352 A1 | 3/2004 | Lottner | |
| 2005/0081594 A1 | 4/2005 | Segal | |
| 2009/0248260 A1 | 10/2009 | Flanagan | |
| 2010/0031718 A1 | 2/2010 | Heil | |
| 2010/0064756 A1 | 3/2010 | Kraft | |
| 2010/0196643 A1 | 8/2010 | Dugard et al. | |
| 2014/0102161 A1 | 4/2014 | Stewart et al. | |
| 2014/0318293 A1 | 10/2014 | Nelson | |
| 2014/0324213 A1 | 10/2014 | Stewart et al. | |

FOREIGN PATENT DOCUMENTS

| | | |
|---|---|---|
| EP | 0001391 A1 | 4/1979 |
| EP | 0114570 A2 | 8/1984 |
| EP | 1785204 | 5/2007 |
| GB | 718077 A | 11/1954 |
| GB | 777845 A | 6/1957 |
| GB | 1318642 | 5/1973 |
| JP | S5338262 A | 10/1978 |
| JP | S5732821 A | 2/1982 |
| JP | 57130718 | 8/1982 |
| JP | H-2220711 | 9/1990 |
| JP | H-04371316 A | 12/1992 |
| JP | H-0569034 | 3/1993 |
| JP | 2004009112 | 1/2004 |
| JP | 2004034064 | 2/2004 |
| JP | 2005000990 | 1/2005 |
| JP | 2005000991 A | 1/2005 |
| JP | 2005000992 A | 1/2005 |
| JP | 2007130661 | 5/2007 |
| JP | 2008254059 | 10/2008 |
| KR | 10-1999-0084470 | 12/1999 |
| KR | 10-2005-0047542 | 5/2005 |
| RU | 14762 | 8/2000 |
| RU | 2004127296 | 2/2006 |
| SU | 241947 | 4/1969 |
| SU | 1044374 | 9/1983 |
| SU | 1574308 | 6/1990 |
| WO | WO-2009008819 | 1/2009 |

OTHER PUBLICATIONS

Search Report for Russian Application No. 2015117640 dated Sep. 29, 2017, 2 pages.
Search Report for Russian Application No. 2015117653 dated Sep. 14, 2017, 2 pages.
Apr. 11, 2019 Examiner Report of Indian Patent Application No. 1843/DELNP/2015.

* cited by examiner

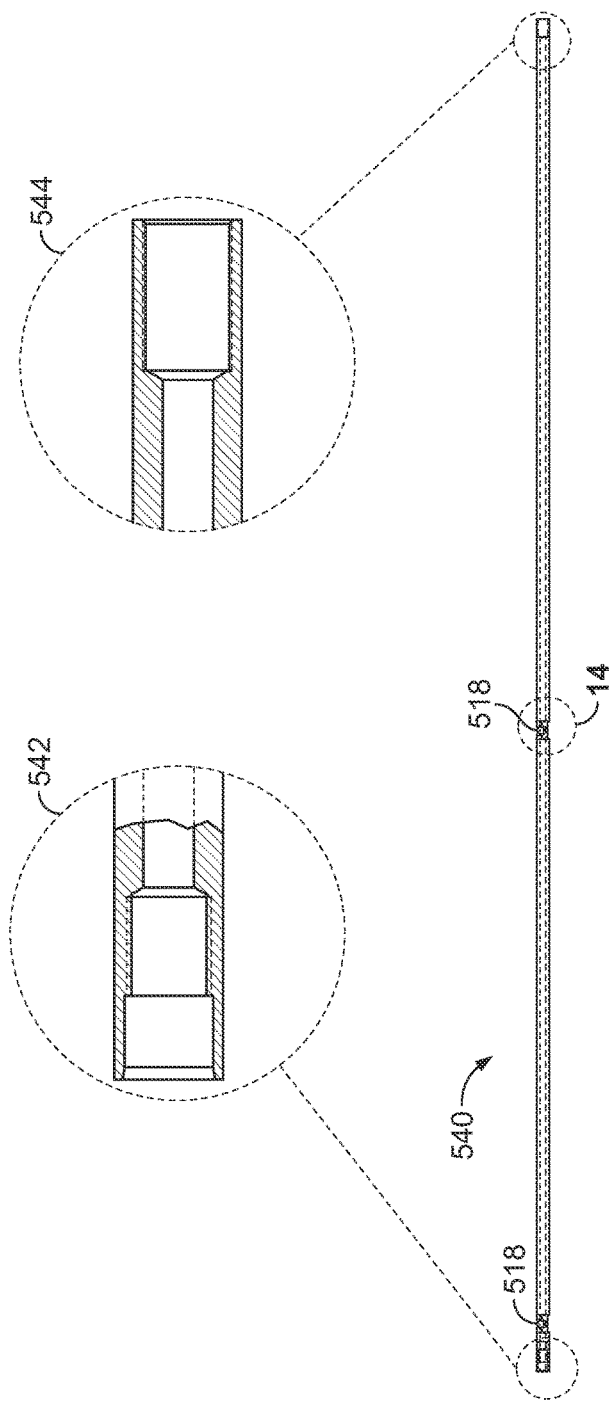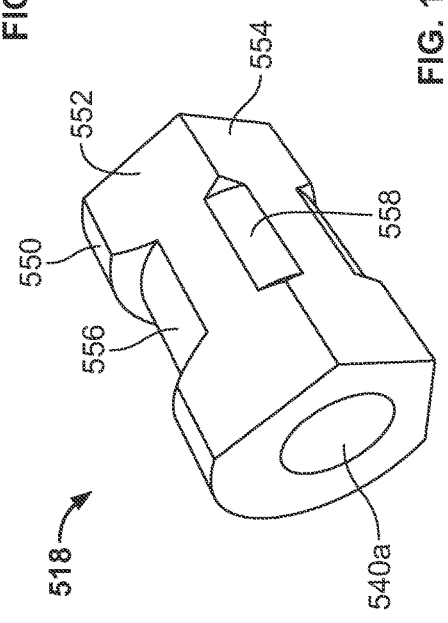

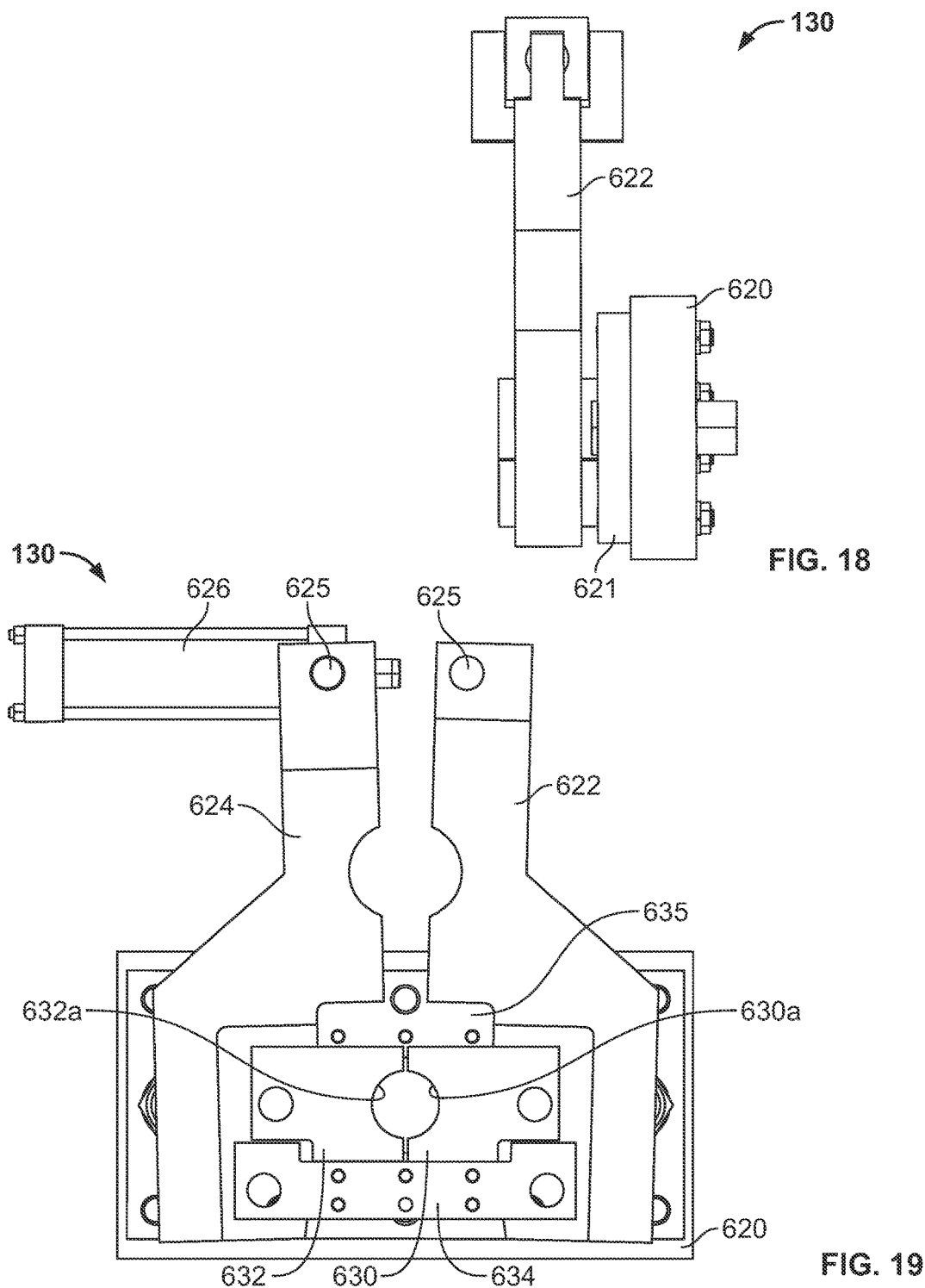

EXTRUSION PRESS SYSTEMS AND METHODS

This application is a division of U.S. patent application Ser. No. 13/650,977, filed Oct. 12, 2012, now U.S. Pat. No. 9,346,089, which is hereby incorporated by reference herein in its entirety.

BACKGROUND

The properties of a material are affected by the processing used to form and shape the material. Processing includes heat treatment, deformation, and casting. Heat treatment is the process of subjecting a metal or alloy to a particular schedule of heating and cooling that causes desirable physical or chemical changes. Deformation is the process of forcing a piece of material to change its thickness or shape, and some deformation techniques include forging, rolling, extruding, and drawing. Casting is the pouring of melted metal into a mold so that the metal conforms to the shape of the mold when it solidifies. Heat treatment, deformation, and casting can be used in combination, and in some cases particular alloying elements are added to influence such processing in a desirable way.

Seamless metal tubing, such as copper tubing, is typically manufactured using various methods such as cast-and-roll, up-casting, or extrusion processes. To lower the cost of manufacturing metal tubing produced by conventional extrusion and casting techniques, manufacturers increase the size of billets used for forming the metal tubing. These billets are typically 100 to 1,000 pounds or more. Manufacturers thus require very large facilities to house the specialized large-scale machinery needed to processes the billets to form metal tubing. The sheer size of the equipment, and the billets processed by the equipment, causes the extrusion process to have large start-up and maintenance costs. Furthermore, limitations of the processes, such as extruding only one billet at a time, lead to manufacturing inefficiencies including limits on the amount of tubing produced per run and system component wear caused by the constant start-up and shut-down of the manufacturing process with respect to separate runs for each billet.

SUMMARY

Disclosed herein are systems, devices, and methods for extruding materials. In certain embodiments, the systems, devices, and methods allow for continuous extrusion of a plurality of billets. Such continuous extrusion allows for relatively smaller billets to be used to produce a desired quantity of extruded material, and therefore the scale of such continuous extrusion press systems can be smaller than conventional extrusion processes. The systems, devices, and methods allow for continuous seamless extrusion of the plurality of billets.

In one aspect, the systems, devices, and methods of the present disclosure include a method for continuously loading and extruding a plurality of billets, the method comprising loading a first billet at a receiving end of an elongate mandrel bar, transporting the first billet along the mandrel bar and through gripping elements that secure in place and prevent rotation of the mandrel bar, wherein at any given time at least one gripping element is gripping the mandrel bar, and extruding the first billet to form an extruded material by pressing the first billet through a rotating die, wherein the first billet is followed by an adjacent second billet that forms a part of the extruded material. The rotating die heats the billet as the billet advances through the rotating die. In certain implementations, a substantially constant pushing force is provided against the first billet in a direction towards the rotating die. In certain implementations, the rotation speed of the rotating die may be adjusted.

In certain implementations, the method further includes transporting the first billet along the mandrel bar and through cooling elements that clamp to the mandrel bar and deliver cooling fluid to the mandrel bar, wherein at any given time at least one cooling element is clamped to the mandrel bar. The billet may be transported along the mandrel bar via a track that intermittently moves depending on the position of the first billet relative to the gripping elements and the cooling elements. In certain implementations, the cooling fluid is transported to a mandrel bar tip provided on a second end of the mandrel bar opposite the receiving end, and the cooling fluid is returned to the cooling elements after passing through the mandrel bar tip. The mandrel bar tip may be positioned within the rotating die prior to receiving the first billet. In certain implementations the cooling fluid is water.

In certain implementations, continuously loading the plurality of billets further comprises the gripping elements alternately gripping the mandrel bar to allow one or more billets to pass through the gripping elements. In certain implementations, a downstream gripping element grips the mandrel bar and an upstream gripping element is open, and the method includes loading the one or more billets onto the mandrel bar and past the open upstream gripping element, closing the open upstream gripping element, and advancing the one or more billets to the downstream gripping element. In certain implementations, the method then includes opening the downstream gripping element, advancing the one or more billets past the open downstream gripping element, and closing the downstream gripping element.

In certain implementations, continuously loading the plurality of billets further comprises the cooling elements alternately clamping the mandrel bar to allow one or more billets to pass through the cooling elements. In certain implementations, a downstream cooling element clamps the mandrel bar and delivers cooling fluid to the mandrel bar, and an upstream cooling element is open, and the method includes loading the one or more billets onto the mandrel bar and past the open upstream cooling element, closing the open cooling gripping element, and advancing the one or more billets to the downstream cooling element. In certain implementations, the method then includes opening the downstream cooling element, advancing the one or more billets past the open downstream cooling element, and closing the downstream cooling element.

In certain implementations, the method further includes, during the extruding, preventing a portion of the first billet that has not yet entered the rotating die from rotating. A centering insert may grip the portion of the first billet to prevent rotation of said portion, and the centering insert may have an adjustable position relative to the rotating die. The centering insert may be cooled with a cooling fluid.

In certain implementations, the method further includes quenching the extruded material when the extruded material exits the rotating die. The extruded material may be quenched using water. In certain implementations, the water contacts the extruded material within approximately 1 inch of the rotating die. In certain implementations, the rotating die comprises a plurality of stacked die plates. In certain implementations, the material is copper, or the material is selected from the group consisting of copper, aluminum, nickel, titanium, brass, steel, and plastic. The plurality of billets may extend along substantially the entire length of the mandrel bar. In certain implementations, the method includes flooding the interior of the extruded material with nitrogen. Each of the plurality of billets may be loaded onto the mandrel bar by a human or by an automated loading device.

In one aspect, there is provided a method for continuously loading and extruding a plurality of billets, the method comprising receiving a first billet at a receiving end of an elongate mandrel bar, transporting the first billet along the mandrel bar and through cooling elements that clamp to the mandrel bar and deliver cooling fluid to the mandrel bar, wherein at any given time at least one cooling element is clamped to the mandrel bar, and extruding the first billet to form an extruded material by pressing the first billet through a rotating die, wherein the first billet is followed by an adjacent second billet that forms a part of the extruded material.

In certain implementations, the first billet is transported along the mandrel bar via a track that intermittently moves depending on the position of the first billet relative to the cooling elements. In certain implementations, the cooling fluid is transported to a mandrel bar tip provided on a second end of the mandrel bar opposite the receiving end, and the cooling fluid is returned to the cooling elements after passing through the mandrel bar tip. The mandrel bar tip may be positioned within the rotating die prior to receiving the first billet. In certain implementations, the cooling fluid is water.

In one aspect, an extrusion press system comprises a mandrel bar having a first end and a second end, the first end for receiving a billet having a hole therethrough and the second end coupled to a mandrel bar tip, a cooling element coupled to the mandrel bar, the cooling element having a port through which cooling fluid is delivered into the interior of the mandrel bar for cooling the mandrel bar tip, a gripping element coupled to the mandrel bar, the gripping element comprising moveable grips for securing in place and preventing rotation of the mandrel bar, and a rotating extrusion die configured to receive the billet from a centering insert having a plurality of notches that frictionally engage the billet to prevent the billet from rotating prior to entry of the billet into the rotating extrusion die, wherein the mandrel bar tip is positioned within the rotating die.

In certain implementations, the extrusion press system further includes a press-ram element having moveable first and second arms that together grip the billet and provide a substantially constant pushing force in the direction of the rotating die. The substantially constant pushing force may cause the billet to enter the rotating die at a predetermined rate. In certain implementations, the extrusion press system further comprises a motor coupled to a spindle that controls the rotation speed of the rotating extrusion die.

In certain implementations, the mandrel bar comprises an opening proximate to the cooling element ports, which opening receives the cooling fluid. The mandrel bar may further comprise notches about the mandrel bar on either side of the opening, wherein the notches are configured to receive an o-ring to substantially prevent the cooling fluid from leaking. The mandrel bar may further comprise a mandrel bar sleeve about the opening that substantially prevents the cooling fluid from leaking. In certain implementations, the mandrel bar comprises a grip portion that is correspondingly shaped to mate with the gripper of the gripping element. In certain implementations, the mandrel bar comprises an inner tube therein that receives the cooling fluid from the cooling element and through which the cooling fluid is delivered to the mandrel bar tip. The cooling fluid may be returned to the cooling element from the mandrel bar tip along a space within the mandrel bar between the outer surface of the inner tube and the inner surface of the mandrel bar. In certain implementations, the cooling fluid is water.

In certain implementations, the extrusion press system further comprises a track along which the billet is transported, wherein the track intermittently moves depending on the position of the billet relative to the gripping elements and the cooling elements. The track may include upper rolling wheels located above the track and configured to contact an upper surface of the billet. In certain implementations, the extrusion press system further comprises a quench tube provided at an exit of the rotating extrusion die. The quench tube quenches the extruded material when the extruded material exits the rotating extrusion die. In certain implementations, the extruded material is quenched using water. The water may contact the extruded material within approximately 1 inch of the rotating extrusion die.

In one aspect, a system is provided for controlling at least in part the extrusion of a plurality of billets, and the system includes a processor configured to provide instructions to an extrusion press system for loading a first billet at a receiving end of an elongate mandrel bar, transporting the first billet along the mandrel bar and through gripping elements that secure in place and prevent rotation of the mandrel bar, wherein at any given time at least one gripping element is gripping the mandrel bar, and extruding the first billet to form an extruded material by pressing the first billet through a rotating die, wherein the first billet is followed by an adjacent second billet that forms a part of the extruded material.

In certain implementations, the processor is further configured to provide instructions to an extrusion press system for intermittently moving a track upon which the first billet is placed based on the location of the first billet with respect to the gripping elements. In certain implementations, the processor is further configured to provide instructions to an extrusion press system for adjusting a rotation speed of the rotating die. In certain implementations, the processor is further configured to provide instructions to an extrusion press system for monitoring a cooling fluid delivery system. In certain implementations, the processor is further configured to provide instructions to an extrusion press system for adjusting the advancing and retraction speeds of press-rams that deliver the plurality of billets to the rotating die.

In one aspect, a non-transitory computer-readable medium is provided for controlling at least in part the extrusion of a plurality of billets, the non-transitory computer-readable medium comprising logic recorded thereon for loading a first billet at a receiving end of an elongate mandrel bar, transporting the first billet along the mandrel bar and through gripping elements that secure in place and prevent rotation of the mandrel bar, wherein at any given time at least one gripping element is gripping the mandrel bar, and extruding the first billet to form an extruded material by pressing the first billet through a rotating die, wherein the first billet is followed by an adjacent second billet that forms a part of the extruded material.

In certain implementations, the non-transitory computer-readable medium further comprises logic recorded thereon for intermittently moving a track upon which the first billet is placed based on the location of the first billet with respect to the gripping elements. In certain implementations, the non-transitory computer-readable medium further comprises logic recorded thereon for adjusting a rotation speed of the rotating die. In certain implementations, the non-transitory computer-readable medium further comprises logic recorded thereon for monitoring a cooling fluid delivery system. In certain implementations, the non-transitory computer-readable medium further comprises logic recorded thereon for adjusting the advancing and retraction speeds of press-rams that deliver the plurality of billets to the rotating die.

In one aspect, an extrusion press system comprises a mandrel bar having a first end and a second end, the first end for receiving a billet having a hole therethrough and the second end coupled to a mandrel bar tip, cooling means for delivering cooling fluid into the interior of the mandrel bar for cooling the mandrel bar tip, gripping means for securing in place and preventing rotation of the mandrel bar, and rotating extrusion means for extruding the billet, wherein the rotating extrusion means receives the billet from centering means having a plurality of notches that frictionally engage the billet to prevent the billet from rotating prior to entry of the billet into the rotating extrusion means, wherein the mandrel bar tip is positioned within the rotating extrusion means.

In certain implementations, the extrusion press system further includes pressing means for gripping the billet and providing a substantially constant pushing force in the direction of the rotating extrusion means. The substantially constant pushing force may cause the billet to enter the rotating extrusion means at a predetermined rate. In certain implementations, the extrusion press system further includes means for controlling the rotation speed of the rotating extrusion means.

In certain implementations, the mandrel bar comprises an opening proximate to the cooling means, which opening receives the cooling fluid. The mandrel bar may further comprise notches about the mandrel bar on either side of the opening, wherein the notches are configured to receive an o-ring to substantially prevent the cooling fluid from leaking. The mandrel bar may further comprise a mandrel bar sleeve about the opening that substantially prevents the cooling fluid from leaking. In certain implementations, the mandrel bar may further comprise a grip portion that is correspondingly shaped to mate with the gripping means. In certain implementations, the mandrel bar comprises an inner tube therein that receives the cooling fluid from the cooling means and through which the cooling fluid is delivered to the mandrel bar tip. The cooling fluid may be returned to the cooling means from the mandrel bar tip along a space within the mandrel bar between the outer surface of the inner tube and the inner surface of the mandrel bar. In certain implementations, the cooling fluid is water.

In certain implementations, the extrusion press system further comprises a track along which the billet is transported, wherein the track intermittently moves depending on the position of the billet relative to the gripping means and the cooling means. The track may include upper rolling wheels located above the track and configured to contact an upper surface of the billet. In certain implementations, the extrusion press system further comprises quenching means provided at an exit of the rotating extrusion means. The quenching means quenches the extruded material when the extruded material exits the rotating extrusion means. In certain implementations, the extruded material is quenched using water. The water may contact the extruded material within approximately 1 inch of the rotating extrusion means.

In one aspect, a method for continuously extruding a plurality of billets comprises transporting, along a non-rotating mandrel bar, the plurality of billets from a first end of the mandrel bar to a second end of the mandrel bar, and extruding the plurality of billets by pressing each of the plurality of billets through a rotating die, wherein friction from the rotation of the rotating die against the non-rotating plurality of billets generates heat for deforming the plurality of hollow billets, wherein a mandrel bar tip is positioned within the rotating die at the second end of the mandrel bar. In certain implementations, the method includes, during the extruding, preventing a portion of a respective one of the plurality of billets that has not yet entered the rotating die from rotating. In certain implementations, a centering insert grips the portion of the respective billet to prevent rotation of said portion, and the centering insert has an adjustable position relative to the rotating die. In certain implementations, the method further includes cooling the mandrel bar tip during the extruding.

In one aspect, a die for extruding a material includes a die body having a passage defining an entrance and an exit, with the diameter of the exit being smaller than the diameter of the entrance, and an interior surface extending around the passage from the entrance to the exit. A base is coupled to the die body, and rotation of the base causes the die body to rotate.

In certain implementations, the die body is configured to receive a billet of material for extrusion, and the billet is not pre-heated before entering the die body. Rotation of the die body creates friction between the interior surface and a billet advanced through the entrance and into the interior passage of the die body. The friction heats the billet to a temperature that is sufficient to cause deformation of the billet material. In certain implementations, the die body is configured to receive a mandrel tip through the entrance such that the mandrel tip is positionable within the interior passage of the die body. The interior surface of the die may include an angled portion configured to be positioned near a corresponding tapered outer surface of the mandrel tip. The die body is configured to receive a billet pressed through the interior passage of the die body to form an extruded product, the extruded product having an outer diameter corresponding to the diameter of the exit of the die body and an inner diameter corresponding to a diameter of the mandrel tip.

In certain implementations, the die body includes a plurality of die plates coupled together to form a stack. Each die plate has a circular bore through the center of the plate, and perimeters of the bores form the interior surface in the die body. The perimeter of the bores are angled at different angles with respect to an axis extending through the die body from the entrance to the exit. An angle of the perimeter near a front face of each plate in the die body is greater than an angle of the perimeter near a back face of an adjacent plate. The stack may include a non-uniform die plate having a bore perimeter angled at first angle near a front face of the plate and angled at a different second angle near a rear face of the plate. At least one of the die plates is formed from two different materials, with a first material forming a perimeter of a bore in the die plate and a second material forming an outer portion of the die plate. The first material may be a ceramic material, a steel, or a consumable material. In certain implementations, a front face of the die body near the entrance is configured to mate with a centering insert having a diameter substantially equal to the diameter of the entrance. The centering insert and a perimeter of the entrance may be formed from the same material. The centering insert does not rotate when the base and die rotate. In certain implementations, the base comprises a circular bore having a diameter greater than the diameter of the exit of the die body. A motor may supply a rotational force to the base.

In one aspect, a die includes a means for extruding a material, and the means for extruding includes a passage means defining an entrance and an exit, where the diameter of the exit is smaller than the diameter of the entrance, and an interior surface means extending around the passage means from the entrance to the exit. The die also has a means for coupling the means for extruding to a rotation means, and rotation of the means for coupling causes the means for extruding to rotate.

In certain implementations, the means for extruding is configured to receive a billet of material for extrusion, and the billet is not pre-heated before entering the die body. Rotation of the means for extruding creates friction between the interior surface means and a billet advanced through the entrance and into the passage means of the means for extruding. The friction heats the billet to a temperature that is sufficient to cause deformation of the billet material. The means for extruding is configured to receive a rod tip means through the entrance such that the rod tip means is positionable within the passage means of the means for extruding. The interior surface means of the means for extruding includes an angled portion configured to be positioned near a corresponding tapered outer surface of the rod tip means. The means for extruding is configured to receive a billet passed through the passage means of the means for extruding to form an extruded product, the extruded product having an outer diameter corresponding to the diameter of the exit of the means for extruding and an inner diameter corresponding to a diameter of the rod tip means.

In certain implementations, the means for extruding comprises a plurality of plate means coupled together to form a stack. Each plate means has a circular bore through the center of the plate means, and perimeter of the bores form the interior surface means in the means for extruding. The perimeters of the bores are angled at different angles with respect to an axis extending through the means for extruding from the entrance to the exit. An angle of the perimeter near a front face of each plate means in the means for extruding is greater than an angle of the perimeter near a back face of an adjacent plate means. The stack may include a non-uniform plate means having a bore perimeter angled at a first angle near a front face of the plate means and angled at a different second angle near a rear face of the plate means. At least one of the plate means is formed from two different materials, with a first material forming a perimeter of a bore in the plate means and a second material forming an outer portion of the plate means. The first material may be a ceramic material, a steel, or a consumable material. A front face of the means for extruding near the entrance is configured to mate with a centering means having a diameter substantially equal to the diameter of the entrance. The centering means and a perimeter of the entrance may be formed from the same material. Wherein the centering means does not rotate when the means for coupling and the means for extrusion rotate. The centering means includes gripping means that prevent rotation of a billet passing through the centering means. In certain implementations, the means for coupling comprises a circular bore having a diameter greater than the diameter of the exit of the means for extruding, and a power means may supply a rotational force to the means for coupling.

Variations and modifications of these embodiments will occur to those of skill in the art after reviewing this disclosure. The foregoing features and aspects may be implemented, in any combination and subcombination (including multiple dependent combinations and subcombinations), with one or more other features described herein. The various features described or illustrated herein, including any components thereof, may be combined or integrated in other systems. Moreover, certain features may be omitted or not implemented.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which:

FIG. 13 shows a schematic view of an illustrative mandrel bar having a portion that mates with a mandrel bar grip;

FIG. 14 shows a perspective view of the mandrel bar portion of FIG. 13;

FIGS. 17-19 show front, side, and rear elevation views, respectively, of the press-ram platen of FIG. 16;

DETAILED DESCRIPTION

Figure 1:
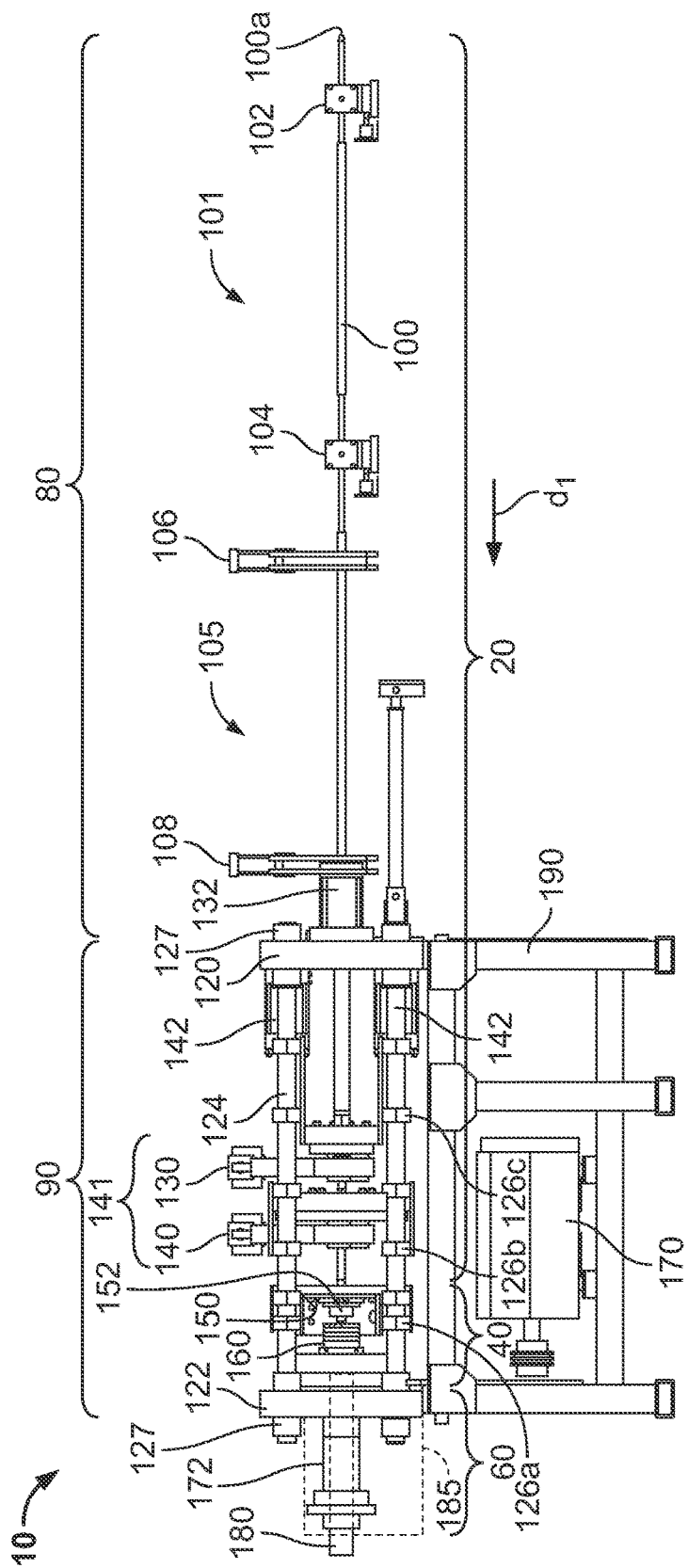
FIG. 1 shows a side elevation view of an illustrative extrusion press system.

To provide an overall understanding of the systems, devices, and methods described herein, certain illustrative embodiments will be described. Although the embodiments and features described herein are specifically described for use in connection with continuous extrusion press systems, it will be understood that all the components, connection mechanisms, manufacturing methods, and other features outlined below may be combined with one another in any suitable manner and may be adapted and applied to systems to be used in other manufacturing processes, including, but not limited to cast-and-roll, up-cast, heat treatment, other extrusion, and other manufacturing processes. Furthermore, although the embodiments described herein relate to extruding metal tubing from hollow billets, it will be understood that the systems, devices, and methods herein may be adapted and applied to systems for extruding any suitable type of extruded product using billets.

The extrusion press system operates using frictional heat generated from a non-rotating hollow billet coming into contact with a rotating die to facilitate deformation and extrusion of the billet. There is thus no requirement of pre-heating the billets or the rotating die before the extrusion. The amount of heat generated is generally determined by the rate at which the billets are fed into the rotating die (e.g., controlled by the press-ram speed of the press-ram elements 130, 140 of FIG. 1) and the rotation speed of the die (e.g., controlled by the rotation speed of the spindle 172 of FIG. 1), as well as the interior profile of the rotating die. Higher press-ram speeds and spindle rotation speeds generate relatively greater amounts of heat.

The rotating die forms the outer diameter of an extruded tube produced by the extrusion press system, and a mandrel bar tip positioned within the rotating die forms the inner diameter of the extruded tube. In certain embodiments, chilled process water, or any other suitable cooling fluid, is used to cool the process elements including the rotating die, the centering insert, the billets, and the gear box oil, as well as the extruded tubing product. Unlike conventional extrusion techniques, the extrusion press system of the present disclosure does not require any container within which to hold the billet for extrusion. Therefore the billets to be extruded preferably have sufficient column strength to withstand the pressure applied by the press-ram elements during the extrusion process. A programmable logic controller, or PLC, controls all or a subset of movements of the extrusion press system while the system is set in automatic mode.

The extrusion press systems, devices, and methods described herein may provide for continuous extrusion of a plurality of billets to produce a seamless extruded tubing product according to various seamless tubing standards including, for example, the ASTM-B88 Standard Specification for Seamless Copper Water Tube. The seamless extruded tubing of the present disclosure may also comply with the standards under NSF/ANSI-61 for Drinking Water System Components.

FIG. 1 shows an extrusion press system 10 according to certain embodiments. The extrusion press system 10 includes structural sections referred to herein as the mandrel carriage section 80 and the platen structure section 90. The mandrel carriage section 80 includes a mandrel bar 100, fluid clamps or cooling elements 102 and 104, mandrel grips or gripping elements 106 and 108, and a billet delivery system 110 shown in detail in FIG. 2. The mandrel carriage section 80 is supported by a physical carriage structure, which is not shown in FIG. 1 to avoid overcomplicating the drawing, but which carriage structure serves as a mount for the components of the mandrel carriage 80. The platen structure section 90 includes an entry platen 120 and a rear die platen 122, press-ram platens 130 and 140, a centering platen 150, and a rotating die 160 that presses against the rear die platen 122. The platen structure section 90 is supported by a frame 190 that also serves as a mount for the motor 170 and related gearbox components (not shown). The direction along which billet loading, transport, and extrusion occurs according to the extrusion press system 10 is denoted by directional process arrow $d_1$. The extrusion press system 10 may be operated, at least in part, by a PLC system that controls various aspects of the billet delivery subsystem 20, extrusion subsystem 40, and quenching or cooling subsystem 60 of the extrusion press system 10.

The mandrel grips 106, 108 comprise a mandrel bar gripping system 105 designed to hold the mandrel bar in place while allowing a plurality of billets to be continuously fed along and about the mandrel bar 100 to provide for continuous extrusion. The billets may be formed from any suitable material for use in extrusion press systems including, but not limited to, various metals including copper and copper alloys, or any other suitable non-ferrous metals such as aluminum, nickel, titanium, and alloys thereof, ferrous metals including steel and other iron alloys, polymers such as plastics, or any other suitable material or combinations thereof. The mandrel grips 106, 108 may be controlled by the PLC system to securely hold the mandrel bar 100 such that at any given time during the extrusion process, at least one of the mandrel grips 106, 108 is gripping the mandrel bar 100. The mandrel grips 106, 108 set the position of the mandrel bar 100 and prevent the mandrel bar 100 from rotating. When the mandrel grips 106, 108 are in a gripping or engaged position, thereby gripping the mandrel bar 100, the mandrel grips 106, 108 prevent billets from being transported along the mandrel bar 100 through the grips.

The mandrel grips 106, 108 operate by alternately gripping or engaging the mandrel bar 100 to allow one or more billets to pass through a respective mandrel grip at a given time. For example, the upstream mandrel grip 106 may release or disengage the mandrel bar 100 while the downstream mandrel grip 108 is gripping the mandrel bar 100. At any given time, at least one of the mandrel grips 106, 108 is preferably gripping or otherwise engaged with the mandrel bar 100. One or more billets queued or indexed near the upstream mandrel grip 106, or being transported along the mandrel bar 100, may pass through the open upstream mandrel grip 106. After a specified number of billets has passed through the open upstream mandrel grip 106, the gripper 106 may close and thereby return to gripping the mandrel bar 100, and the billets may be advanced to the downstream gripping element 108. The downstream gripping element 108 may remain closed, thereby gripping the mandrel bar 100, or the downstream mandrel grip 108 may open after the upstream mandrel grip 106 re-grips the mandrel bar 100. Although two mandrel grips 106, 108 are shown in the extrusion press system 10, it will be understood that any suitable number of mandrel grips may be provided.

The fluid clamps 102, 104 comprise a mandrel bar fluid delivery system 101 designed to supply cooling fluid along the interior of the mandrel bar 100 to the mandrel bar tip during the extrusion process. The fluid clamps 102, 104 also receive cooling fluid from the mandrel bar 100 that has returned from the mandrel bar tip. Any suitable cooling fluid may be used, including water, various mineral oils, brines, synthetic oils, any other suitable cooling fluid, including gaseous fluids, or any combination thereof. The fluid clamps 102, 104 may be controlled by the PLC system to continuously supply process cooling fluid to the mandrel bar during the extrusion process while allowing a plurality of billets to be continuously feed along and about the mandrel bar 100. The fluid clamps 102, 104 operate such that there is no or substantially no interruption to the supply of process cooling fluid to the mandrel bar tip during the extrusion process. Similar to the operation of the mandrel grips 106, 108 discussed above, when the fluid clamps 102, 104 are clamped to or engaged with the mandrel bar 100, the fluid clamps 102, 104 prevent billets from being transported along the mandrel bar 100 through the fluid clamps.

The fluid clamps 102, 104 operate such that at any given time during the extrusion at least one of the fluid clamps is clamped to or engaged with the mandrel bar 100 and thereby delivers cooling fluid into the mandrel bar 100 for delivery to the mandrel bar tip. When a billet passes through one of the fluid clamps 102, 104, the respective fluid clamp discontinues delivering (and receiving) cooling fluid and releases or disengages the mandrel bar 100 to allow the billet to pass therethrough before re-clamping the mandrel bar 100 and continuing to deliver (and receive) cooling fluid. While one of the fluid clamps 102, 104 is unclamped or disengaged from the mandrel bar 100, the other fluid clamp continues to deliver cooling fluid to the mandrel bar.

For example, the upstream fluid clamp 102 may release the mandrel bar 100 while the downstream fluid clamp 104 is clamped to the mandrel bar 100. At any given time, at least one of the fluid clamps 102, 104 is preferably clamped to the mandrel bar 100 to continuously deliver cooling fluid. One or more billets queued or indexed near the upstream fluid clamp 102, or being transported along the mandrel bar 100, may pass through the open upstream fluid clamp 102. After a specified number of billets has passed through the open upstream fluid clamp 102, the fluid clamp 102 may close and thereby return to clamping the mandrel bar 100 and delivering cooling fluid, and the billets may be advanced to the downstream fluid clamp 104. The downstream fluid clamp 104 may remain closed, thereby clamping the mandrel bar 100, or the downstream fluid clamp 104 may open after the upstream fluid clamp 102 re-clamps to the mandrel bar 100. Although two fluid clamps 102, 104 are shown in the extrusion press system 10, it will be understood that any suitable number of fluid clamps may be provided.

Figure 2:
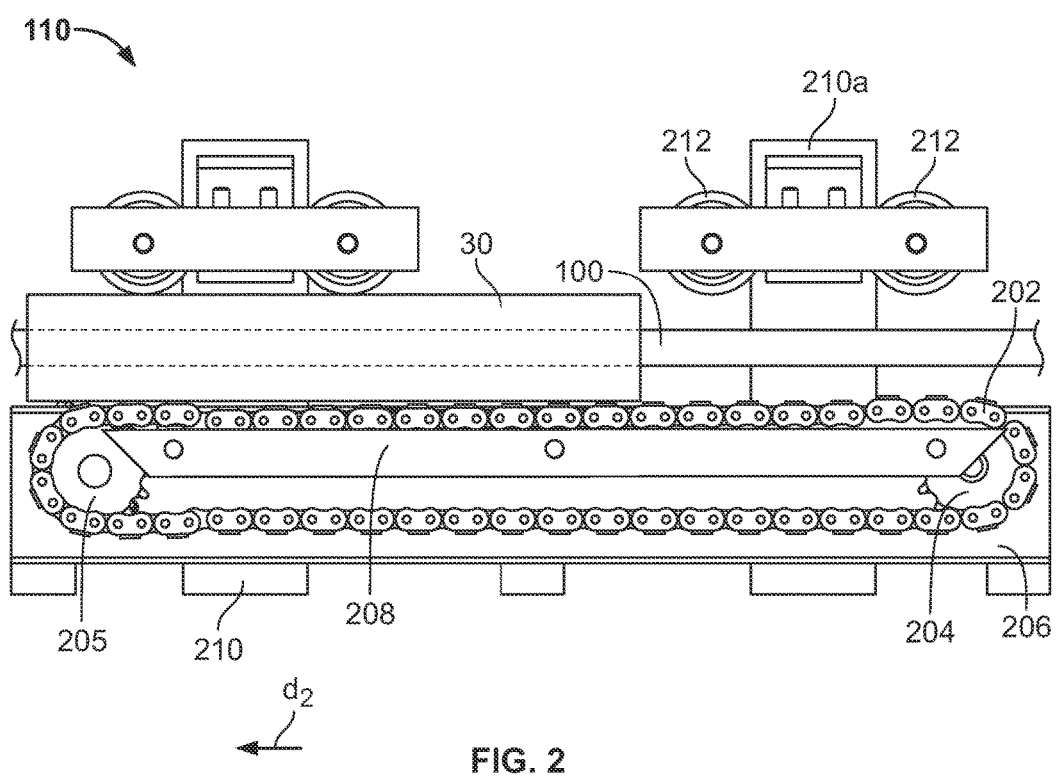
FIG. 2 shows a side elevation view of an illustrative billet feed track assembly for use with the extrusion press system of FIG. 1.

The billet delivery system 20 includes the billet feed track assembly 110 of FIG. 2. The billet delivery system 110 ensures that a continuous supply of billets, such as billet 30, is present for the extrusion process. When additional billets are needed, the PLC system will cycle the proper mandrel bar grips 106, 108, fluid clamps 102, 104, and billet delivery rollers (e.g., the billet feed track assembly 110) to ensure that the billet supply is continuous. The section of the mandrel carriage 80 located between the mandrel grip 106 and the entry platen 120 may continuously index to minimize the gap between billets fed into the ram platen sections 141 of the platen structure 90. For example, at this location of the mandrel carriage 80, the track assembly 110 may continuously cycle the track 202 to feed billets into the platen structure 90.

The billet feed track assembly 110 includes a chain or a track 202 positioned about sprockets 204 and 205. One or more of the sprockets 204, 205 may be coupled to a motor (not shown) that operates to move or cycle the track 202 in a loading direction, $d_2$. The track 202 and sprockets 204, 205 are supported by a base rail 206 and a low rail 208, which together couple to a frame 210. An upper portion 210a of the frame 210 includes top roller wheels 212 that provide an upper bound for a passing billet 30. For example, as show in FIG. 2, the mandrel bar 100 includes a billet 30 loaded thereon, where the billet 30 moves via contact with the track 202 and is stabilized by the top roller wheels 212. The billet feed track assembly 110 may have any suitable length. For example, the track assembly 110 may extend along substantially the length of the mandrel bar 100 within the mandrel carriage section 80. In certain embodiments, there may be provided a plurality of track assemblies that together operate to feed billets along the mandrel bar 100 and into the platen structure section 90. For example, there may be track assemblies provided along the mandrel bar 100 between each of the fluid clamps 102, 104 and the mandrel grips 106, 108 such that one or more billets can be independently cycled through respective fluid clamps 102, 104 and mandrel grips 106, 108, without requiring transport of other billets as would occur if there were only a single track assembly.

Returning to FIG. 1, the mandrel bar 100 extends along substantially the length of the extrusion press system 10 and is positioned to place the mandrel bar tip within the rotating die 160. The adjustment to properly position the mandrel bar tip within the rotating die 160 is accomplished by moving the mandrel carriage section 80, thus moving the mandrel bar 100. The adjustments to the mandrel bar 100 and the mandrel carriage section 80 may be towards or away from the die 160. The mandrel bar 100 and the mandrel carriage section 80 preferably cannot be adjusted while the extrusion press system 10 is in operation, although it will be understood that in certain embodiments the mandrel bar 100 and/or mandrel carriage section 80 may be adjusted during operation.

As discussed above, the extrusion press system 10 includes a platen structure section 90 having an entry platen 120 and a rear die platen 122, press-ram platens 130 and 140, a centering platen 150, and a rotating die 160 pressed against the rear die platen 122. Near the entry platen 120 is the press-ram assembly 141 that includes a first press-ram platen 130 and a second press-ram platen 140. The first and second press-ram platens 130, 140 feed billets into the centering platen 150, which grips the billets and prevents the billets from rotating prior to entering the rotating die 160, which presses against the rear die platen 122. The entry platen 120 and the rear die platen 122 are coupled by a series of tie rods 124 that act as guides for the press-ram platens 130, 140 and the centering platen 150, each of which includes bearings 126a, 126b, 126c that move along the tie rods 124. The rear die platen 122 and the entry platen 120 have mounting locations 127 through which the tie rods 124 are fixed. The entry platen 120, rear die platen 122, and tie rod structure 124 are supported by the frame 190. The frame 190 also holds the spindle 172 and motor 170. At the exit of the rotating die 160 is a quench tube 180 for rapidly cooling the extruded tubing.

The press-ram platens 130, 140 operate by gripping the billets and providing a substantially constant pushing force in the direction of the extrusion die stack 160. At any given time at least one of the press-ram platens 130, 140 grips a billet and advances the billet along the mandrel bar 100 to provide the constant pushing force. The press-ram platens 130, 140 form the final part of the billet delivery subsystem 20 before the billet enters the centering platen 150 and the rotating die 160 of the extrusion subsystem 40. Similar to the billet feed track section before the entry platen 120, the section prior to the press-ram platens 130, 140 preferably continuously indexes the billets to minimize any gaps between a billet that is gripped the press-ram platens 130, 140 and the next billet.

As discussed above, the press-rams 130, 140 continuously push billets into the rotating die 160. The press-rams 130, 140 alternate gripping and advancing billets towards and into the rotating die 160 and then ungripping the advanced billets and retracting for the next gripping/advancing cycle. There is preferably an overlap between the time when one press-ram stops pushing and the other press-ram is about to start pushing so that there is always pressure on the rotating die 160. The press-rams 130, 140 advance and retract via press-ram cylinders coupled to the respective press-ram. As shown there are two press-ram cylinders 132, 142 per press-ram. A first set of press-ram cylinders 132 is located to the left and right of the entry platen 120 (although the right-side press-ram cylinder is hidden from view by the left-side press-ram cylinder). The first set of press-ram cylinders 132 couples with the first press-ram platen 130 and is configured to move the first press-ram 130 along the tie rods 124 as the first press-ram 130 advances billets and then retracts for subsequent billets. A second set of press-ram cylinders 142 is located on the top and bottom of the entry platen 120. The second set of press-ram cylinders 142 couples with the second press-ram platen 140 and is configured to move the second press-ram 140 along the tie rods 124 as the second press-ram 140 advances billets and then retracts for subsequent billets. Although two press-ram cylinders are shown for each of the first and second press-ram platens 130, 140, it will be understood that any suitable number of press-ram cylinders may be provided. In certain embodiments, press-ram cylinders may be coupled to both press-rams 130, 140.

The centering platen 150 receives billets advances by the press-rams 130, 140 and holds the billets to prevent their rotation during the extrusion process prior to entry of the billets into the rotating die 160. When the centering platen 150 is positioned in place for the extrusion process, the centering platen 150 becomes part of the extrusion die 160. That is, a centering insert 152 of the centering platen 150 substantially abuts the rotating die 160. The centering platen 150 itself, however, and the components therein including the centering insert 152, do not rotate with the rotating die 160. The centering platen 150 prevents billets that are no longer held by the second press-ram 140 from rotating while the die 160 rotates by gripping the billets and thereby preventing the billets from rotating prior to entry of the billets into the rotating die.

The rotating die 160 may have a unibody design, or may include a plurality of die plates stacked together. In certain embodiments, the die includes a base plate, a final plate, a second intermediate plate, a first intermediate plate, an entry plate, and a steel end holder, and the die plates are bolted together (e.g., using bolts 704) to form the die 160. The rotating die 160 is bolted to or otherwise coupled with the spindle 172, which is operated by the motor 170. A gear box is bolted to the rear die platen 122 and contains the spindle 172 as well as the drive chain, motor drive gear, gear oil reservoir, and dear oil heat exchanger, which are not shown in FIG. 1 to avoid overcomplicating the figure. In certain embodiments, the spindle motor 170 and the spindle/die gear tooth ration is 2.1:1, although it will be understood that any suitable gear ratio may be used for the rotation of the rotating die 160.

At the extrusion end of the extrusion press system 10 is a quench box 185 bolted or otherwise coupled to the exit side of the gear box on the rear die platen 122. In certain embodiments, within the quench box 185 is a quench tube 180 for rapidly quenching or cooling the extruded material as it exits the rotating die 160. Water may be user as the quenching or cooling fluid, and the water may contact the extruded material sometime after the exit of the extruded material from the rotating die 160. For example, in certain embodiments, the extruded material is quenched with cooling fluid within approximately 1 inch of exiting the rotating die 160. Any suitable cooling fluid may be used for quenching and extruded material, including water, various mineral oils, brines, synthetic oils, any other suitable cooling fluid, including gaseous fluids, or any combination thereof. The quench tube 180 may be formed of one or more tubes having a channel therein for delivering the cooling fluid to the extruded material. In certain embodiments, the quench tube 180 further includes an end cap or other structure through which the cooling fluid is delivered to the extruded material. Any suitable quench tube may be used in the extrusion press system of this disclosure, including, for example, the quench tubes described in commonly-assigned U.S. Pat. No. 9,364, 987, which was copending with parent application Ser. No. 13/650,977, the disclosure of which is hereby incorporated by reference herein in its entirety.

In certain embodiments, nitrogen gas, or another suitable inert gas, is delivered to the interior of an extruded material as the material exits the rotating die. For example, nitrogen gas may be delivered to the interior of extruded tubing using a cap placed on the leading end of the extruded tubing as it exits the rotating die. Injecting gaseous or liquid nitrogen into the rotating die assembly, or the interior of the extruded material itself, can minimize oxide formation by displacing the oxygen-laden air.

Although not shown in FIG. 1, the billet delivery subsystem 20 of the extrusion press system 10 may include a billet delivery table with a plurality of billets prepped for loading onto the extrusion press system 10. The billets may be loaded automatically, for example, by an automated process or may be loaded by hand.

Figure 3:
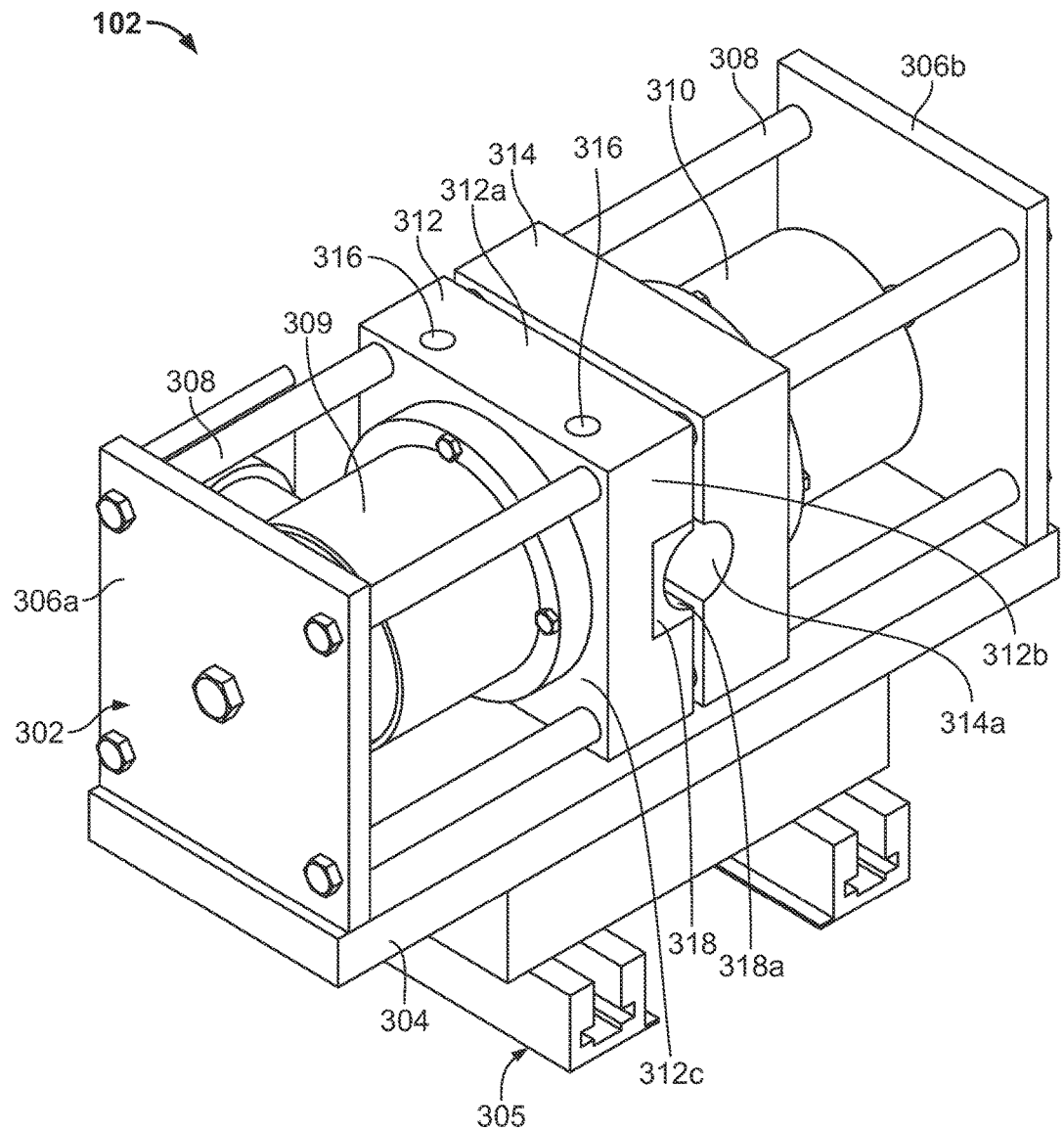
FIG. 3 shows a perspective view of an illustrative fluid clamp.

The various components of the extrusion press system 10 of FIG. 1 will now be described with respect to FIGS. 3-30. FIG. 3 shows a perspective view of the fluid clamp 102 of FIG. 1 according to certain embodiments. The fluid clamp 102 includes a housing 302 having a base 304 and end plates 306a and 306b coupled via four tie rods 308, although it will be understood that any suitable number of tie rods may be used, and in certain embodiments other fixation techniques may be used to secure the elements of the fluid clamp in addition to, or in place of, the tie rods 308. Supported by the tie rods 308 is an inlet/outlet fluid clamp 312, through which cooling fluid such as water enters and exits the fluid clamp 102, and a blank fluid clamp 314, each of which is actuated by a respective cylinder 309, 310 located between the respective clamp 312, 314 and its end plate 306a, 306b. Situated below the housing 302 are carriage rails 305 that secure the fluid clamp 102 onto the carriage structure that supports the mandrel carriage section 80 of FIG. 1. The inlet/outlet fluid clamp 312 includes taps 316 formed in a top surface 312a therein that extend to an insert piece 318 that is inserted into an inner portion of the inlet/outlet fluid clamp 312. As can be seen in FIG. 3, the blank fluid clamp 314 has a clamping surface 314a and the insert 318 within the inlet/outlet fluid clamp 312 has a clamping surface 318a. The clamping surfaces 314a and 318a frictionally engage a respective surface of the mandrel bar, such as the mandrel bar 100 of the extrusion press system 10. In certain embodiments, the clamping surfaces 314a, 318a may engage a mandrel bar sleeve (e.g., mandrel bar sleeve 360 of FIG. 7) provided about a portion of the mandrel bar.

Figure 4:
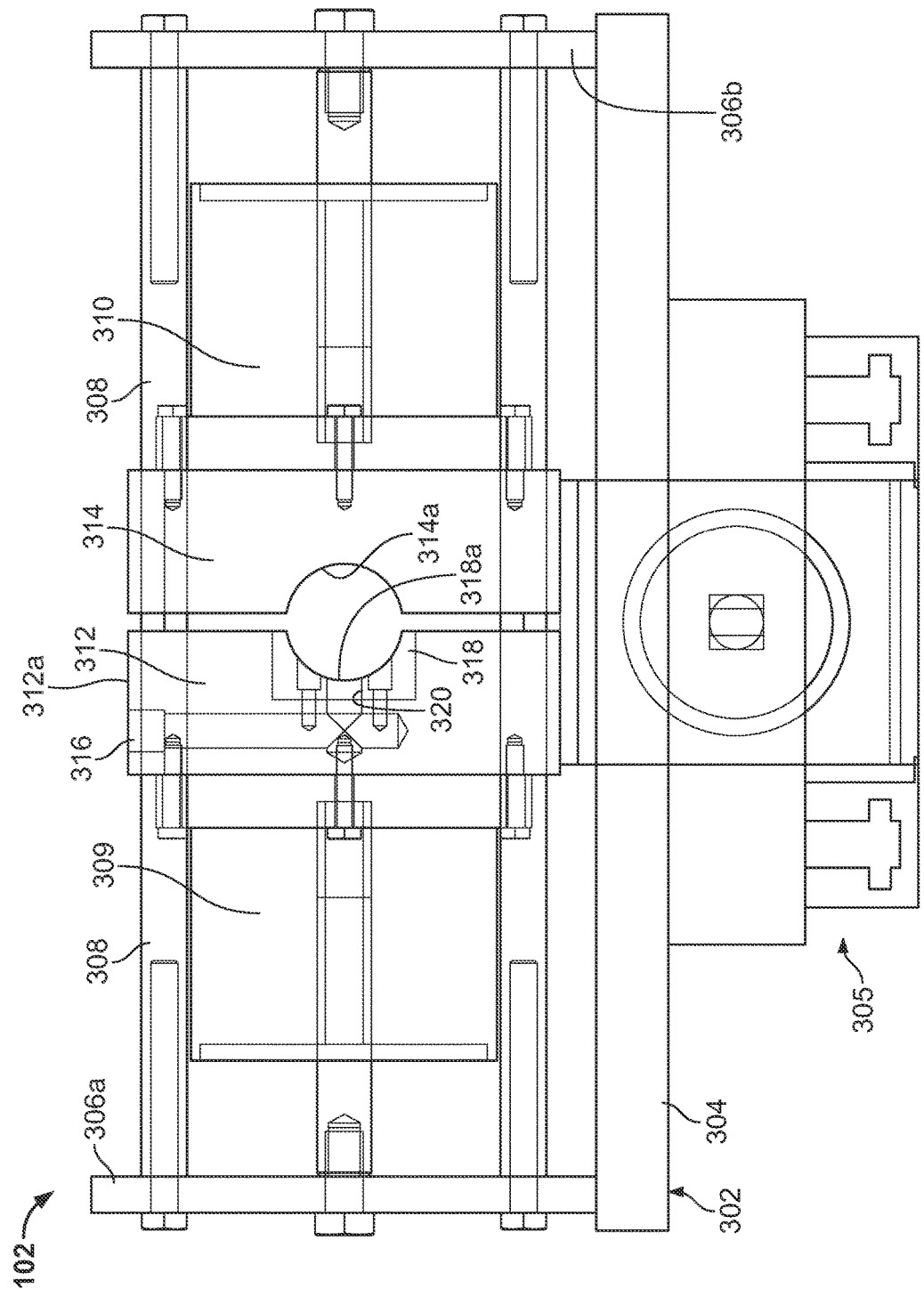
FIGS. 4 and 5 show front and side elevation views, respectively, of the fluid clamp of FIG. 3.
Figure 5:
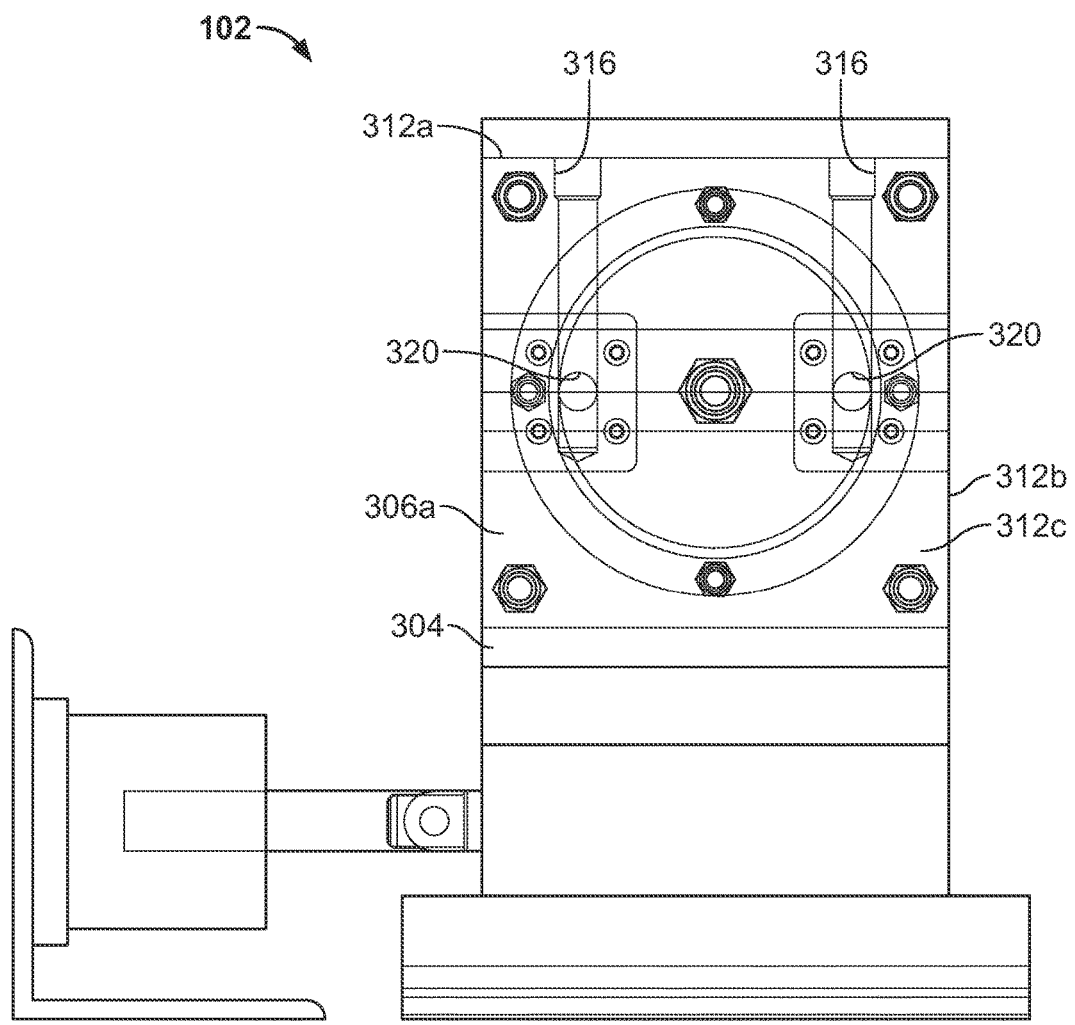

FIGS. 4 and 5 show front and side elevation views, respectively, of the fluid clamp 102 of FIG. 3. As shown in FIGS. 4 and 5, for example, the taps 316 in the inlet/outlet fluid clamp 312 extend from the top surface 312a of the clamp 312 and into ports 320 formed in the insert 318. The fluid clamp 102 delivers cooling fluid to the mandrel bar via the inlet/outlet fluid clamp 312 through the taps 316 and the ports 320. Also shown in FIG. 4 are the clamping surfaces 314a and 318a of the inlet/outlet fluid clamp 312 and the blank fluid clamp 314. Although the fluid clamp 312 includes two taps 316 in fluid communication with two ports 320 of the insert 318, it will be understood that any suitable number of taps and ports may be provided for delivering cooling fluid to the mandrel bar. Alternatively, or additionally, in certain embodiments the taps 316 may be provided through other surfaces of the fluid clamp such as the front (or rear) surface 312b or the lateral surfaces 312c of the inlet/outlet fluid clamp 312.

Figure 6:
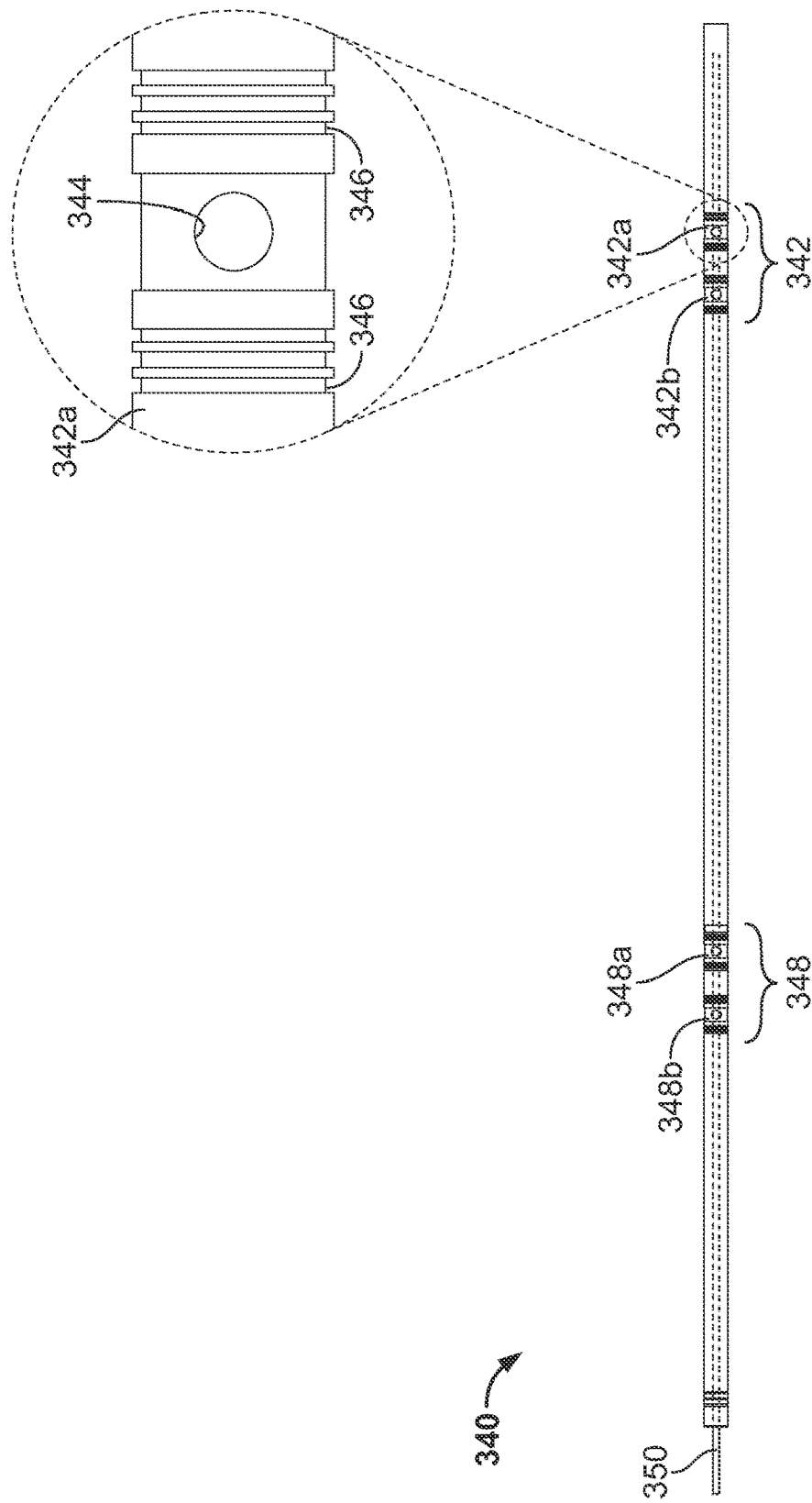
FIG. 6 shows a schematic view of an illustrative mandrel bar having an opening or port for receiving cooling fluid.

In certain embodiments, the clamping surfaces 314a and 318a of the blank fluid clamp 314 and the insert 318 of the inlet/outlet fluid clamp 312 are structured to mate with a corresponding portion of a mandrel bar. FIG. 6 shows a schematic view of a mandrel bar 340 having an opening or port 344 for receiving and/or returning cooling fluid from a fluid clamp according to certain embodiments. As shown in FIG. 6, for example, the mandrel bar 340 includes portions 342 and 348 having two respective port sections 342a, 342b and 348a, 348b for receiving and/or returning cooling fluid from a fluid clamp such as fluid clamp 102. In certain embodiments, port sections 342a and 348a are configured for the return of cooling fluid to a fluid clamp, and the port sections 342b and 348b are configured for the receipt of cooling fluid from the fluid clamp. Alternatively, port sections 342a and 348a may receive cooling fluid, and port sections 342b and 348b may return the cooling fluid. In still further embodiments, port sections 342a/348b may receive cooling fluid and port sections 342b/348a may return cooling fluid, or vice versa. Any suitable receiving/returning arrangement of port sections may be used such that at least one of the respective ports receives cooling fluid and another returns the cooling fluid to the fluid clamp.

Figure 7:
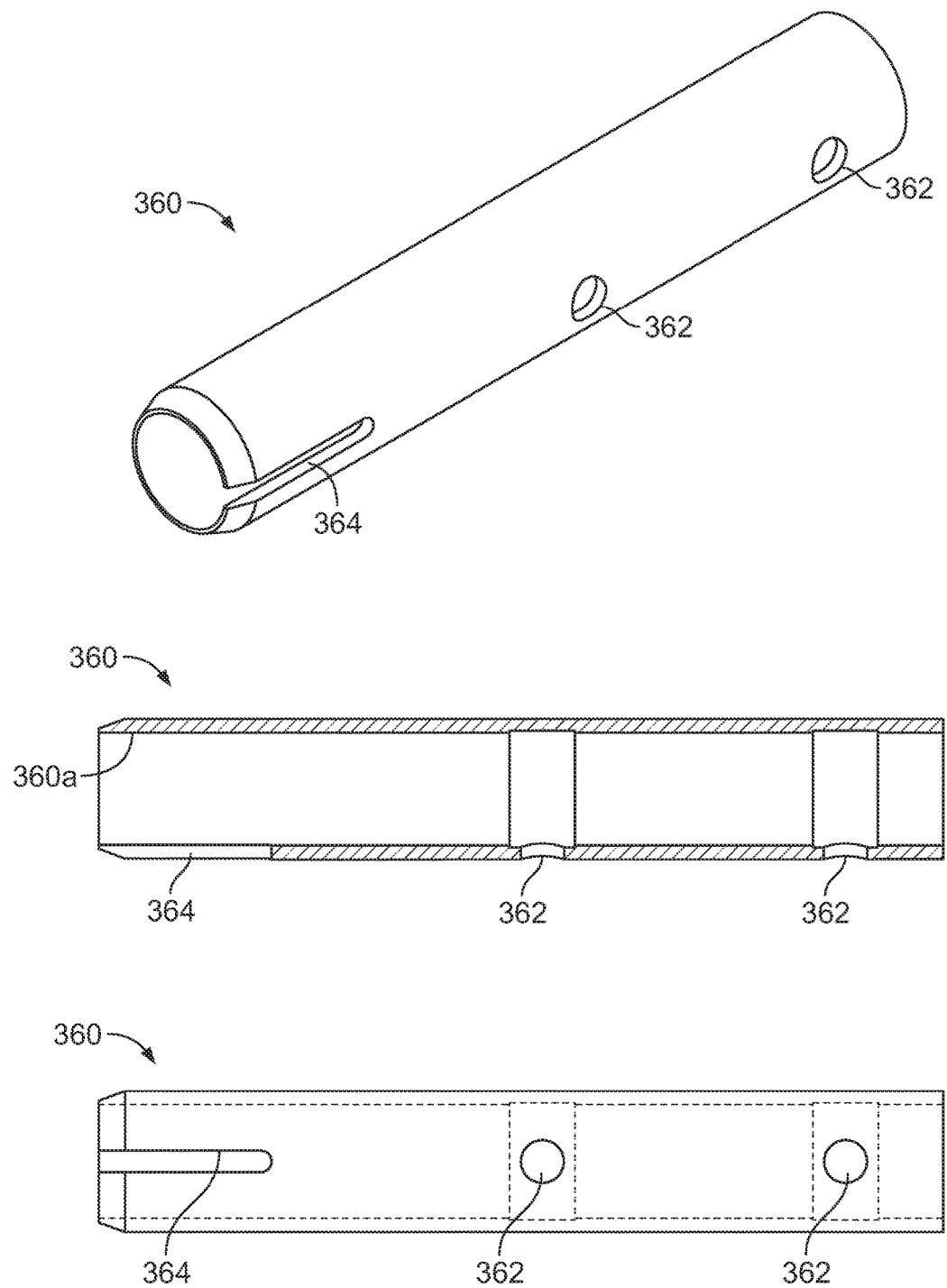
FIG. 7 shows a perspective view and various cross-sectional and side views of an illustrative mandrel bar sleeve.

The inset of the mandrel bar portion 342 shows port section 342a with an opening or port 344 for receiving and/or returning cooling fluid from the fluid clamp 102. The mandrel port 344 is sized to correspond with the respective port 320 of the fluid claim 102. About the mandrel port 344 are a series of notches 346 receiving o-rings and thereby preventing cooling fluid from escaping or otherwise leaking from the mandrel bar 340 via the port 344. The two mandrel bar portions 342, 348 correspond, for example, to the portions of the mandrel bar that interface with the two fluid claims 102, 104 of the extrusion press system 10 of FIG. 1. As discussed above, in certain embodiments a mandrel sleeve 360 may also work together with the o-rings to prevent fluid leakage from the mandrel bar 340 and the fluid clamp. As shown in FIG. 7, for example, a mandrel sleeve 360 includes ports 362 through which cooling fluid is delivered and/or returned between the mandrel bar 340 and a fluid clamp. The mandrel sleeve 360 also includes a slot 364 that allows for flexibility as the sleeve 360 is positioned on the mandrel bar 340 about the portions 342, 348 that receive and/or return cooling fluid. The o-rings in notched 346 may create a substantially fluid-tight seal between the mandrel bar 340 and the inner surface 360a of the mandrel bar sleeve 360.

Figure 8:
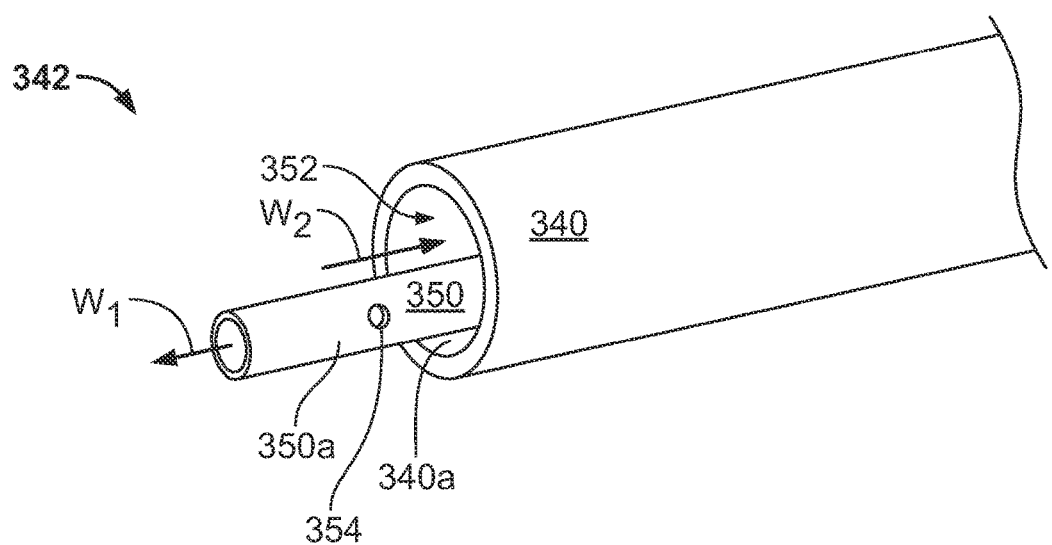
FIG. 8 shows a perspective cross-sectional view of an illustrative mandrel bar having an inner tube for delivering cooling fluid to a mandrel bar tip.
Figure 9:
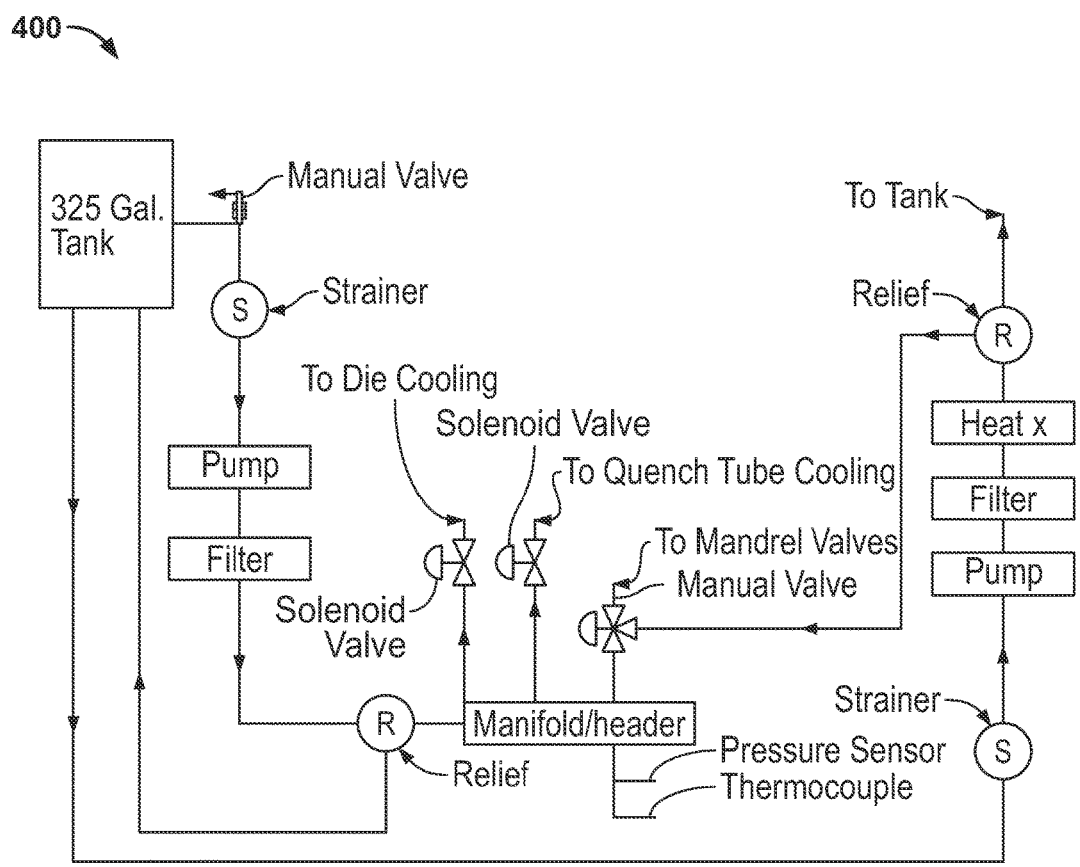
FIG. 9 show a schematic diagram of an illustrative fluid delivery system.

Also shown in FIG. 6 is an inner tube 350 that runs along the length of the mandrel bar 340 and which delivers the cooling fluid to the mandrel bar tip, which is positioned within a rotating die. The cooling fluid that is received through the openings or ports 344 in the mandrel bar 340 travels through an opening 354 in the inner tube 350 such that the cooling fluid is delivered along the inside of the tube 350 to the mandrel bar tip, where it then travels back out of the tube 350, but within the mandrel bar, to the openings or ports 344 from which it was received. The direction of cooling fluid travel is shown in FIG. 8, which depicts a perspective cross-sectional view of the mandrel bar 340 and the inner tube 350 of FIG. 6 for delivering cooling fluid to the mandrel bar tip. The cooling fluid travels along the inside of the inner tube 350 in the direction of arrow W1 towards the mandrel bar tip and then returns in the direction of arrow W2 in the outer space 352 between the outer surface 350a of the inner tube 350 and the inner surface 340a of the mandrel bar 340. In certain embodiments, a portion of the inner surface of the mandrel bar, such as the inner surface 340a of mandrel bar 340, may be threaded for receiving the mandrel bar tip, although the mandrel bar tip may be coupled to the mandrel bar using any suitable technique. In certain embodiments, a spacer may be provided about the inner tube 350 that centers the inner tube 350 within the mandrel bar 340 along any suitable length of the mandrel bar 340. Where the mandrel bar has threads, the spacer may be threaded to the mandrel bar, although the spacer may also press against non-threaded portions of the mandrel bar.

The extrusion press system 10 includes a cooling system 400 for cooling the various components of the press system 10 during operation. Although the cooling system 400 of FIG. 9 will be described as using water as the cooling fluid, it will be understood that any suitable cooling fluid may be used. The extrusion press cooling system 400 is designed to deliver cooled water in sufficient quantities and pressures to cool the process components and the extruded product. In certain embodiments, there may be two main water systems on the press, mandrel water and press water. With respect to the mandrel water, the mandrel water system is supplied water from the holding tank. The heat exchangers cool the process water by exchanging the heat generated during the extrusion process with chilled water from the chiller water system. The process water flows in a serial circuit through the heat exchangers and chilled water flows in a parallel circuit through the heat exchangers, and the two water systems never come into physical content with each other. All of the water is made available to the mandrel water system. A pressure relief valve limits the system pressure. The water not used by the mandrel system is diverted to the holding tank, which cools the process water in the holding tank. The water is pumped through the inside of the mandrel bar through the inner water tube (e.g., inner tube 350 of FIGS. 6 and 8) to the mandrel bar tip and returns down the length of the outer space of the inside of the mandrel bar as discussed with respect to FIGS. 6 and 8. As the water has circulated through the mandrel cooling system, it is returned into the holding tank which is the other source of cooling the process water to the holding tank. Preferably at no time is the mandrel process water supply interrupted while the press is running. The press water system is supplied water from the holding tank. Flow and pressure is regulated by a relief valve with excess water being returned to the holding tank. The press water is pumped to a manifold where is it routed to cool various components of the system, including: the rotating die, by means of a high velocity water spray from a cooling ring which water is routed to cool the gear box hydraulic oil before going to cool the die; the centering insert 152, by means of a constant flow through a centering insert holder; the billets, through a flood system; and the tube being extruded, by use of the quench tube which spray quenches the tube. The quench tube is housed inside the spindle. The process water from the above operations returns back to the holding tank.

Figure 10:
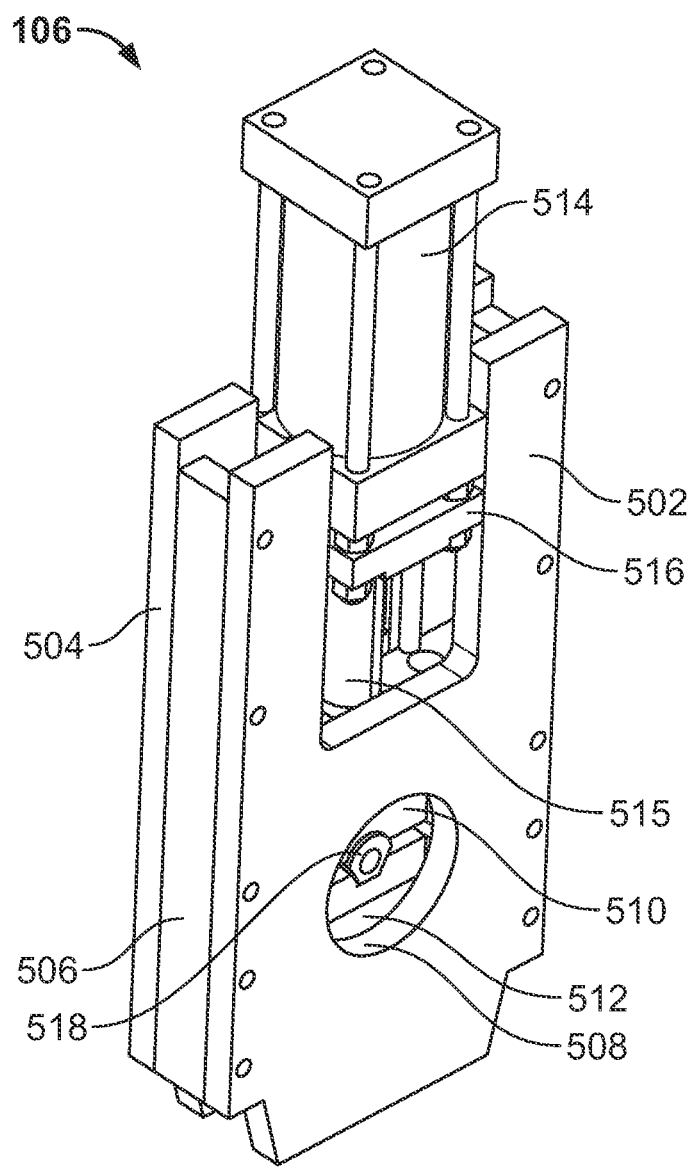
FIG. 10 shows a perspective view of an illustrative mandrel bar grip.

FIG. 10 shows a perspective view of the mandrel grip 106 of FIG. 1 according to certain embodiments. The mandrel grip 106 includes a front plate 502 and back plate 504 separated by a spacer 506. Within the front plate 502 is a cut-out gripping portion 508 and a top grip 510 and bottom grip 512, although it will be understood that alternatively, or additionally, in certain embodiments the grips 510, 512 could be positioned side-to-side rather than top-to-bottom within the mandrel grip 106. The mandrel grip 106 also includes a cylinder 514 and piston rod 515 coupled to a cylinder mount 516. The cylinder 514 operates to control the gripping and ungripping of the top grip 510 and bottom grip 512 with respect to the mandrel bar 100.

Figures 11, 12:
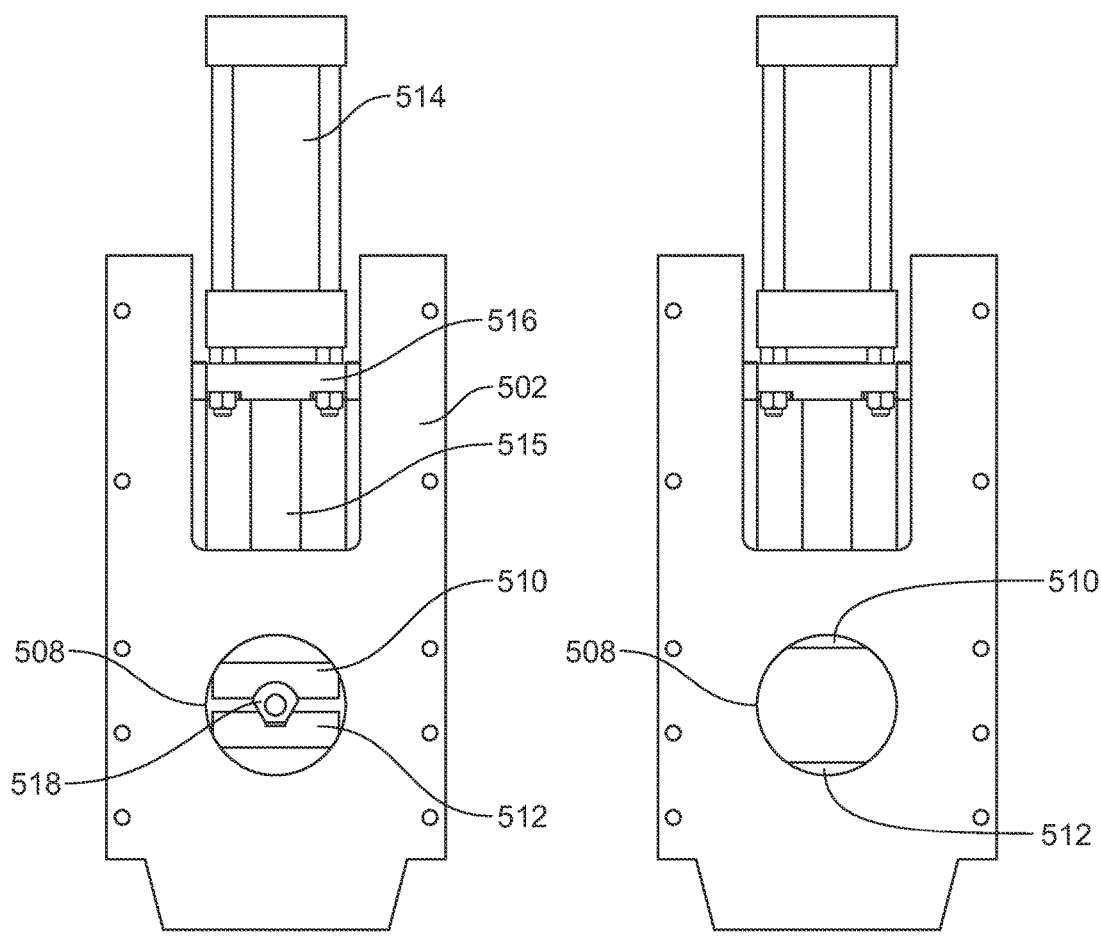
FIGS. 11 and 12 show front elevation views of the mandrel bar grip of FIG. 10 in a gripping position (11) and a non-gripping position (12)

FIGS. 11 and 12 show front elevation views of the mandrel grip 106 of FIG. 10 in a closed or engaged gripping position (FIG. 11) and a non-gripping or open position (FIG. 12). As shown in FIG. 11, for example, the top grip 510 and the bottom grip 512 are in a gripping position and engaged about a mandrel bar portion 518, which is the portion of the mandrel bar to which the grippers 510, 512 grip. When the mandrel grip 106 is in an open or non-gripping position, as shown in FIG. 12, the top grip 510 and the bottom grip 512 are displaced from one another relative to the gripping position and are thereby displaced from the mandrel bar portion 518, such that there is clearance along the mandrel portion 518, and within the gripping cutout 508, for a billet to pass therethrough.

In certain embodiments, the top grip 510 and the bottom grip 512 are structured to mate with a corresponding portion of a mandrel bar, such as the mandrel bar portion 518 of the mandrel bar 540. FIG. 13 shows a schematic view of a mandrel bar 540 having portions 518 that may be shaped or otherwise configured to mate with the top grip 510 and the bottom grip 512 of the mandrel grip 106. The particular shape of the mandrel bar portions 518 may aid the mandrel grip 106 in forming and maintaining a secure grip of the mandrel bar 540 to prevent the mandrel bar 540 from rotating or otherwise moving or displacing during operation of the press system when the mandrel bar 540 is gripped by the mandrel grip 106. As shown in FIG. 13, for example, the two grip portions 518 may correspond to the portions of the mandrel bar that interface with the two mandrel grips 106, 108 of the extrusion press system 10 of FIG. 1.

A perspective view of the portion 518 of the mandrel bar 540 is shown in FIG. 14. The mandrel bar portion 518 is shaped to mate with a mandrel grip such as mandrel grip 106 and includes a rounded circumference portion 550 and various straight edges 552 and 554 that mate with the top and bottom grips of a mandrel grip. The mandrel portion 518 also includes various insets or cut-outs 556 and 558 shaped to mate with complementary grippers. As shown in FIG. 14, the mandrel portion 518 is hollow and includes an inner surface 540a for receiving an inner tube such as the inner tube 350 discussed above with respect to FIGS. 6 and 8.

In certain embodiments, the mandrel bar extends along the length of the extrusion press system 10, terminating at a mandrel bar tip positioned within the rotating die. The mandrel bar may have a substantially continuous cross-section along its length or may have portions thereof (such as portions 342, 348, 518 and mandrel bar sleeve 360) shaped for interfacing with components of the press system such as the fluid clamps 102, 104 and the mandrel grips 106, 108. In certain embodiments, the mandrel bar may be modular and may comprise a plurality of attachable sections that together form the mandrel bar for use with an extrusion press system. For example, the mandrel bar 540 of FIG. 13 may be configured to attach to other mandrel bars, or sections of mandrel bars, such as the mandrel bar 340 of FIG. 6, which shows a portion of a mandrel bar 340 used to couple with fluid clamps. In order to attach these modular portions of a mandrel bar together, the mandrel bar 540 is provided with ends 542 and 544 that receive the complementary ends of another mandrel bar.

Figure 15:
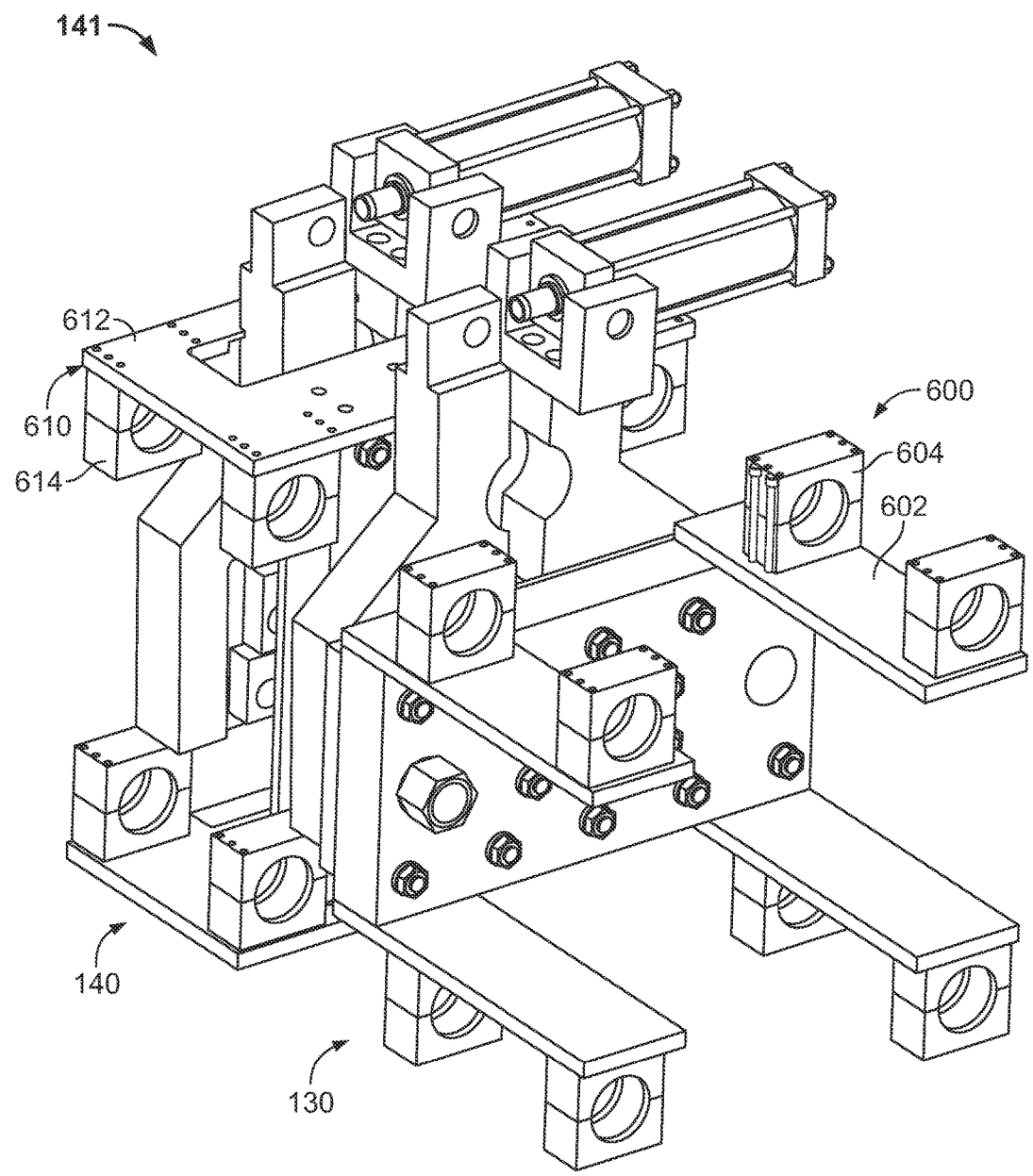
FIG. 15 shows a perspective view of an illustrative press-ram assembly having guide members.

FIG. 15 shows a perspective view of the press-ram assembly 141 of FIG. 1 having guide members for guiding the press-ram assembly 141 along the tie rods 124 according to certain embodiments. As shown in FIG. 15, for example, the first press-ram platen 130 and the second press-ram platen 140 include guide members 600 and 610, respectively. The guide member 600 of press-ram platen 130 has hanging plates 602 coupled to bearings 604, which bearings 604 are configured to move the press-ram 130 along tie rods such as tie rods 124 of FIG. 1. The guide member 610 of press-ram platen 140 also include hanging plates 612 and various bearings 614 configured to move the press-ram 140 along tie rods 124. The hanging plate 614 of guide member 610 is positioned above where the tie-rods 124 are located and the hanging plate 602 of guide member 600 is located below the position at which the tie rods 124 are located. These guide members 600, 610 allow the press-ram platens 130, 140 to move along the tie rods 124 as the extrusion process operates such that the press-ram platens 130, 140 can grip and advance the billets into the rotating die and then retract to begin the next cycle.

Figure 16:
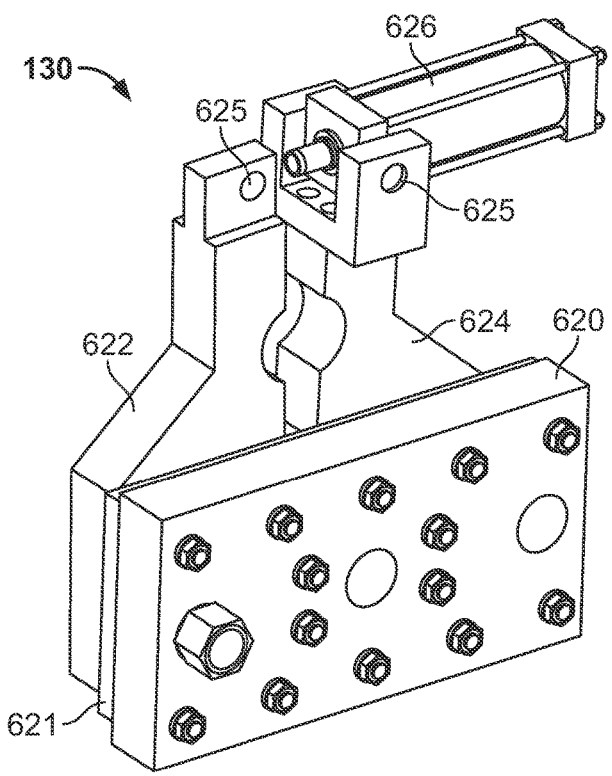
FIG. 16 show a perspective view of an illustrative press-ram platen.
Figure 17:
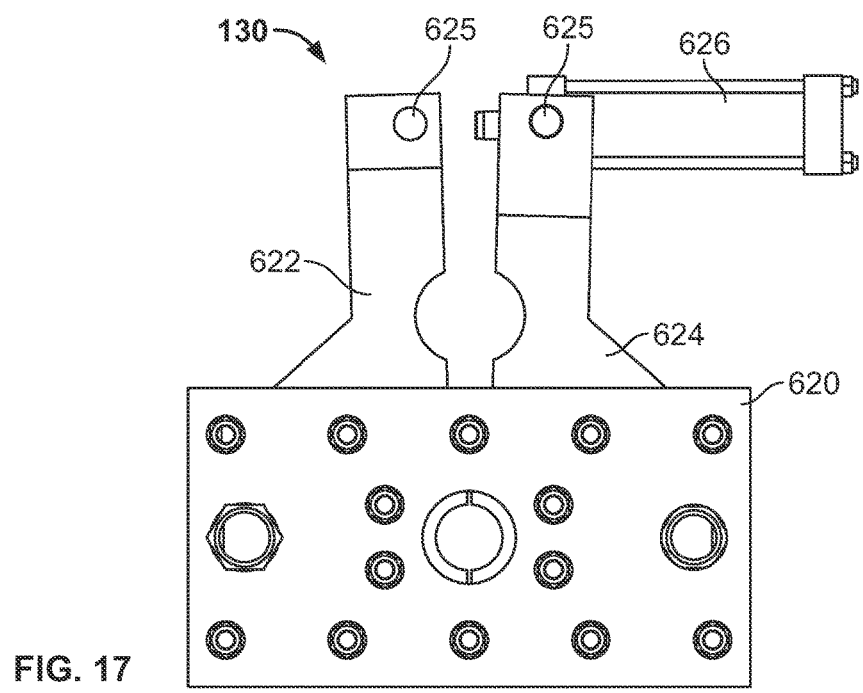

FIG. 16 shows a perspective view of the press-ram platen 130 of FIG. 1 according to certain embodiments. FIGS. 17-19 show front, side, and rear elevation views, respectively, of the press-ram platen 130 of FIG. 16. The press-ram platen 130 includes a grip mounting plate 620 and first and second billet gripper link arms 622 and 624 that are coupled to a cylinder 626 about a pivot 625. The cylinder 626 operates to move the first and second link arms 622, 624 with respect to one another and about the pivot 625. The grip mounting plate 620 is coupled to the link arms 622, 624 and separated by a spacer 621 therebetween. As shown in FIG. 19, first and second grips 630, 632 are mounted to the first and second link arms 622, 624, and are supported by a bottom mount 634 and top mount 635. In certain embodiments, the gripping surfaces 630a, 632a of the first and second grips 630, 632, can have a serrated or otherwise textured surface for improving the frictional contact between the gripping surfaces 630a, 632a and a gripped billet.

Figure 20:
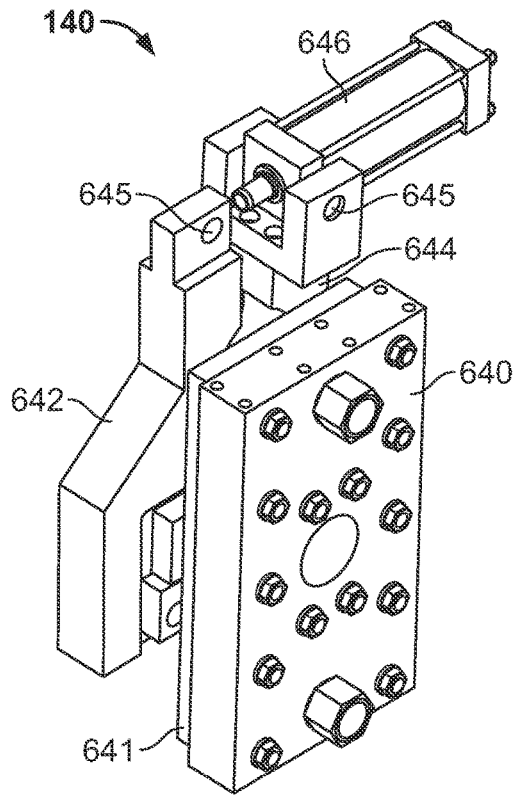
FIG. 20 shows a perspective view of an illustrative press-ram platen.
Figure 21:
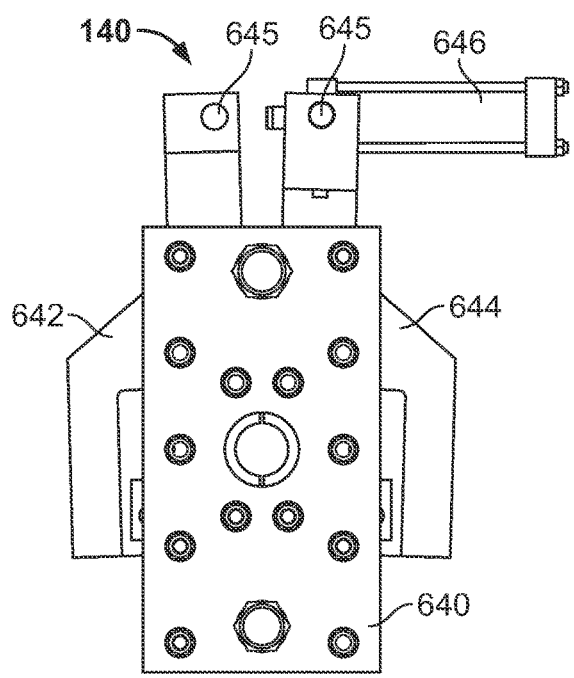
FIGS. 21-23 show front, side, and rear elevation views, respectively, of the press-ram platen of FIG. 20.
Figure 22:
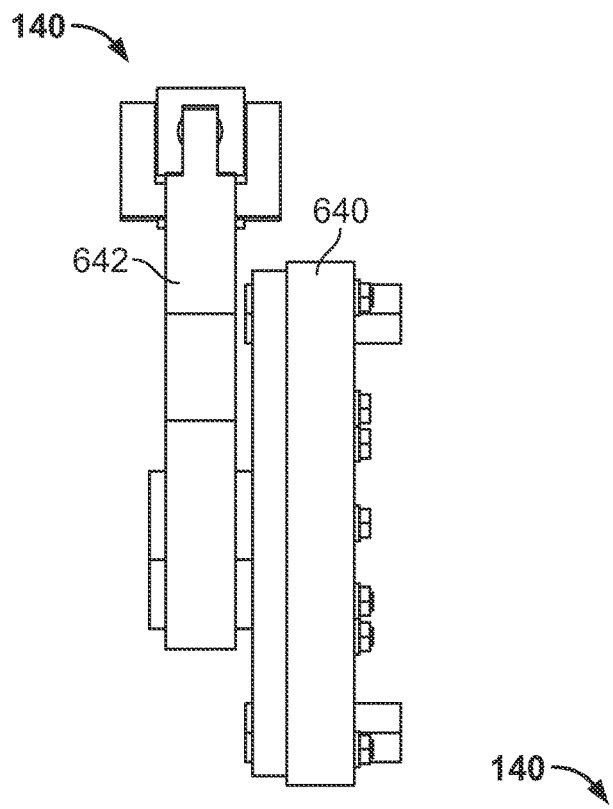
Figure 23:
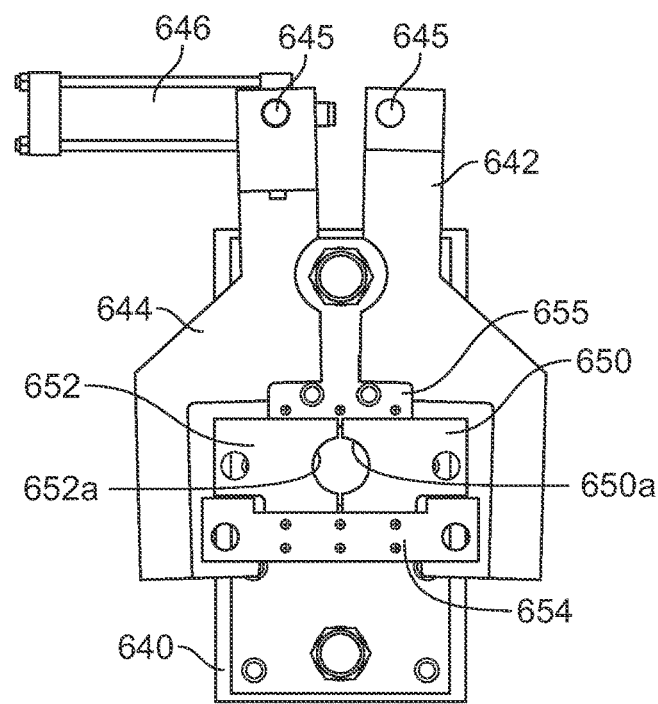

FIG. 20 shows a perspective view of the press-ram platen 140 of FIG. 1 according to certain embodiments. FIGS. 21-23 show front, side, and rear elevation views, respectively, of the press-ram platen 140 of FIG. 20. The press-ram platen includes a grip mounting plate 640 and first and second billet gripper link arms 642 and 644 that are coupled to a cylinder 646 about a pivot 645. The cylinder 646 operates to move the first and second link arms 642, 644 with respect to one another and about the pivot 645. The grip mounting plate 640 is coupled to the link arms 642, 644 and separated by a spacer 641 therebetween. As shown in FIG. 23, first and second grips 650, 652 are mounted to the first and second link arms 642, 644, and are supported by a bottom mount 654 and top mount 655. In certain embodiments, the gripping surfaces 650a, 652a of the first and second grips 650, 652 can have a serrated or otherwise textured surface to increase the frictional contact between the gripping surfaces 650a, 652a and a gripped billet.

In certain embodiments, one or both of the first and second press-rams 130, 140 may include centering links. For example, centering links may be coupled to the link arms 622, 624 and/or the cylinder 626 of the first press-ram 130 for synchronizing movement of the respective arms of the press-ram 130 about the pivot 625. This prevents, for example, operation of the cylinder 626 from extending one arm about the pivot point 625 while the other arm remains still. When the movement of the arms 622, 624 is synchronized about the pivot 625 using the centering links, both arms move together when gripping and releasing the billets.

Figure 24:
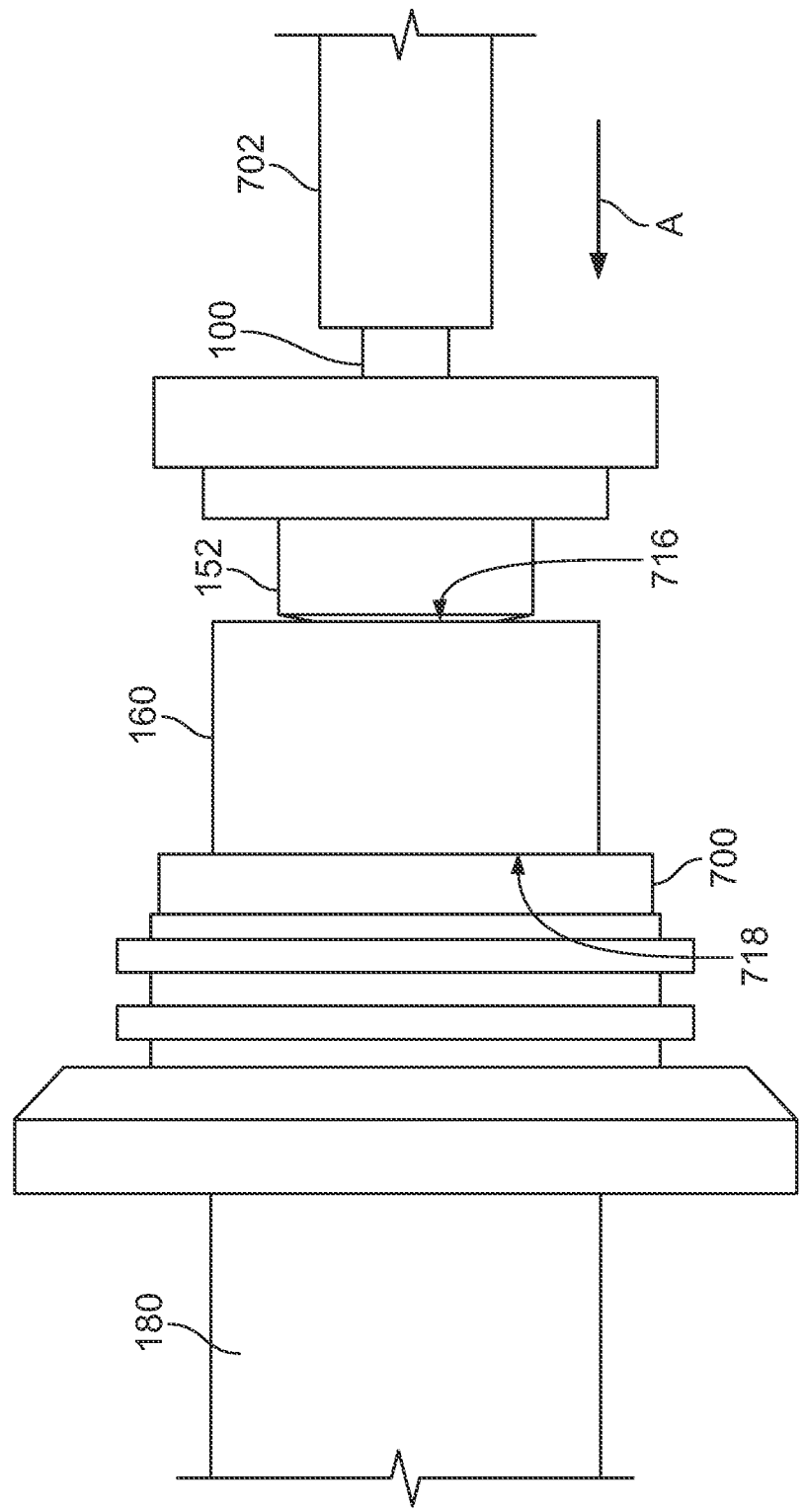
FIG. 24 shows an illustrative rotating die and centering ring in an extrusion orientation.

A billet pressed through the die 160 is extruded by heat generated from friction and forces applied to the billet by an interior surface of the die 160. Before a billet is pressed into the die 160, the die and the centering insert 152 are pressed together to form a sealed mating interface for extrusion, and this orientation is shown in FIG. 24. During extrusion, the die 160 rotates while billet 702 is pressed through the die. The billet 702 is held by grippers on the centering insert 152, which does not rotate, and thus the billet 702 does not rotate as it enters the rotating die 160 at the entrance 716 to the die. The rotation of the die 160 creates friction with the outer surface of the non-rotating billet 702 as it is pressed through the die, and the friction heats the billet 702 to a temperature sufficient for the billet material to deform. For example, a metal billet may be heated by the friction to a temperature grater than 1000° F. for deformation. The temperature requirements of different materials and different metals may vary, and billet temperatures less than 1000° F. may be suitable in some applications. In contrast to other extrusion systems, the extrusion assembly in FIG. 24 does not require pre-heating of billets before extrusion, as the rotation of the die 160 and the friction created by contact with the non-rotating billet 702 provide energy that heats the billet to a deformable temperature.

While the billet 702 and centering insert 152 do not rotate during the extrusion process, the die 160 and base 700 to which the body of the die is connected are rotated by a motor-driven spindle. As the billet 702 is advanced through the centering insert 152, it passes through the entrance 716 of the die 160 and contacts an interior surface of the die, shown in more detail in FIGS. 25-28. In addition to the die 160 and the inner surface details shown in FIGS. 24-28, other die designs or inner surface profiles may be implemented in a rotating die. For example, a dies assembly for an extrusion system may be the die assembly described in commonly-assigned U.S. patent application Ser. No. 13/650, 981, which was copending with parent application Ser. No. 13/650,977, the disclosure of which is hereby incorporated by reference herein in its entirety. A torsional force is applied to the outer surface of the billet 702 due to the interference contact between the rotating die 160 and the billet 702. The grippers on the centering insert 152 resist this torsional force and prevent the billet 702 from rotating before it enters the die 160, creating friction and producing the energy that heats the billet 702.

The interior surface of the die 160 exhibits a tapered profile that narrows the interior passage through the die 160 from the entrance 716 to an exit 718. Thus, when force is applied to the billet 702 to press the billet through the die 160, the material of the billet 702 is extruded as the outer diameter of the material is forced to decrease to pass through the interior of the die 160 from entrance 716 to exit 718. The dimensions of the die 160 and interaction between the interior surface of the die 160 and the billet 702 is described in more detail below with respect to FIGS. 25-28.

Figure 25:
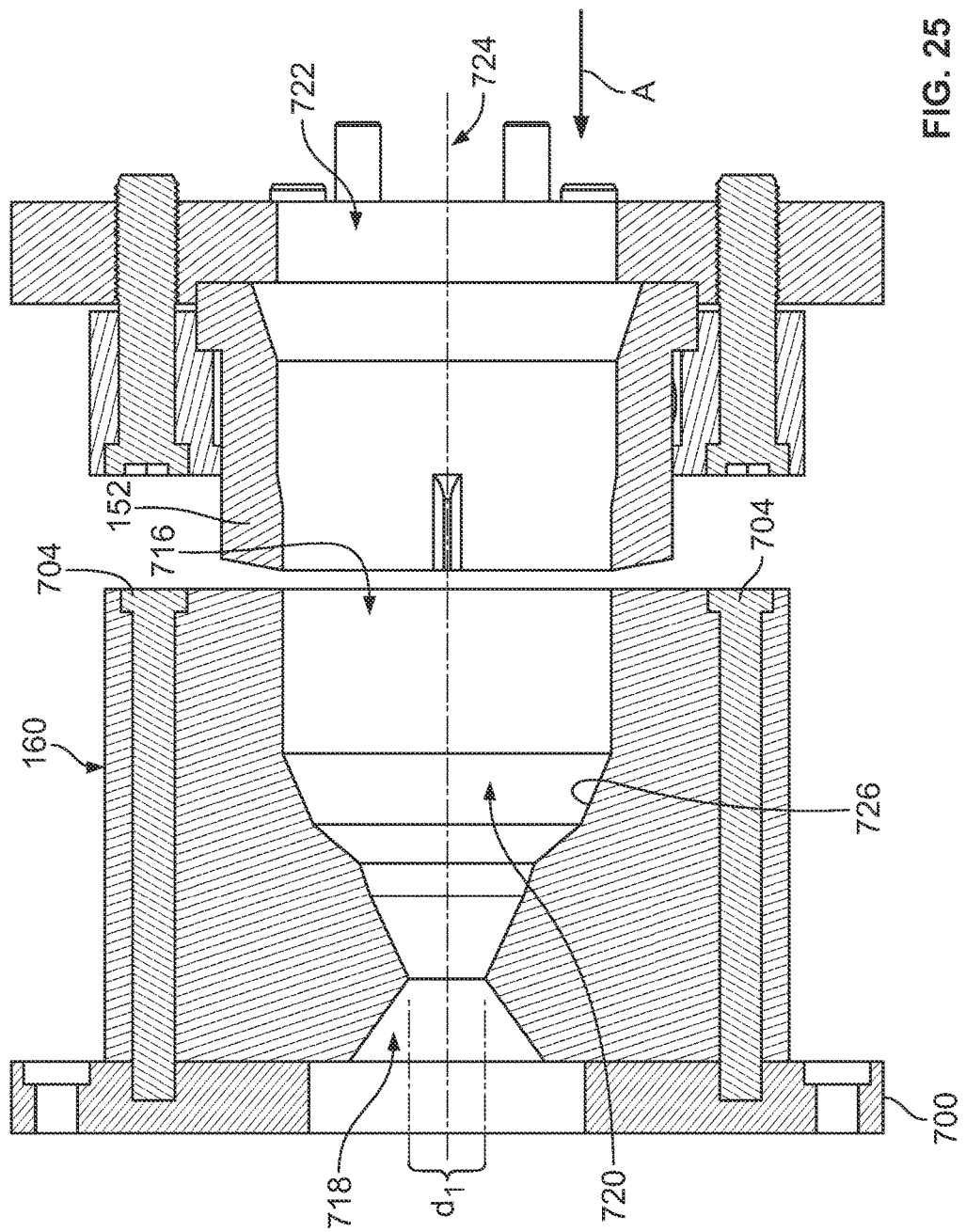
FIG. 25 shows an illustrative cross-sectional view of the rotating die and centering ring of FIG. 24.

The cross section view of the die 160 in FIG. 25 shows the die 160 and the centering insert 152 positioned for extrusion. While the die 160 is shown in FIG. 25 as a single, unibody component, the die may also be composed of multiple die plates having bores and interior surfaces that form the passage and inner surface of the die, as discussed below with respect to FIG. 26. In this orientation, the opening 716 of the interior passage 720 in the die 160 is aligned with the centering insert 152 to receive a billet pressed through the opening 722 of the centering insert 152 and into the die 160 along the center axis 724 of the interior passage 720. The inner surface 726 narrows the interior passage 720 from the largest diameter of the passage at the opening 716 to the smallest diameter at the exit 718, and the narrowing of the passage 720 causes the narrowing deformation and extrusion of a billet pressed into the die 160 during operation. The extrusion requires friction energy to be produced at the interface of the inner surface 726 to heat the billet, and the energy is provided by the interaction of the rotating surface 726 and the non-rotating billet pressed into the die.

Figure 26:
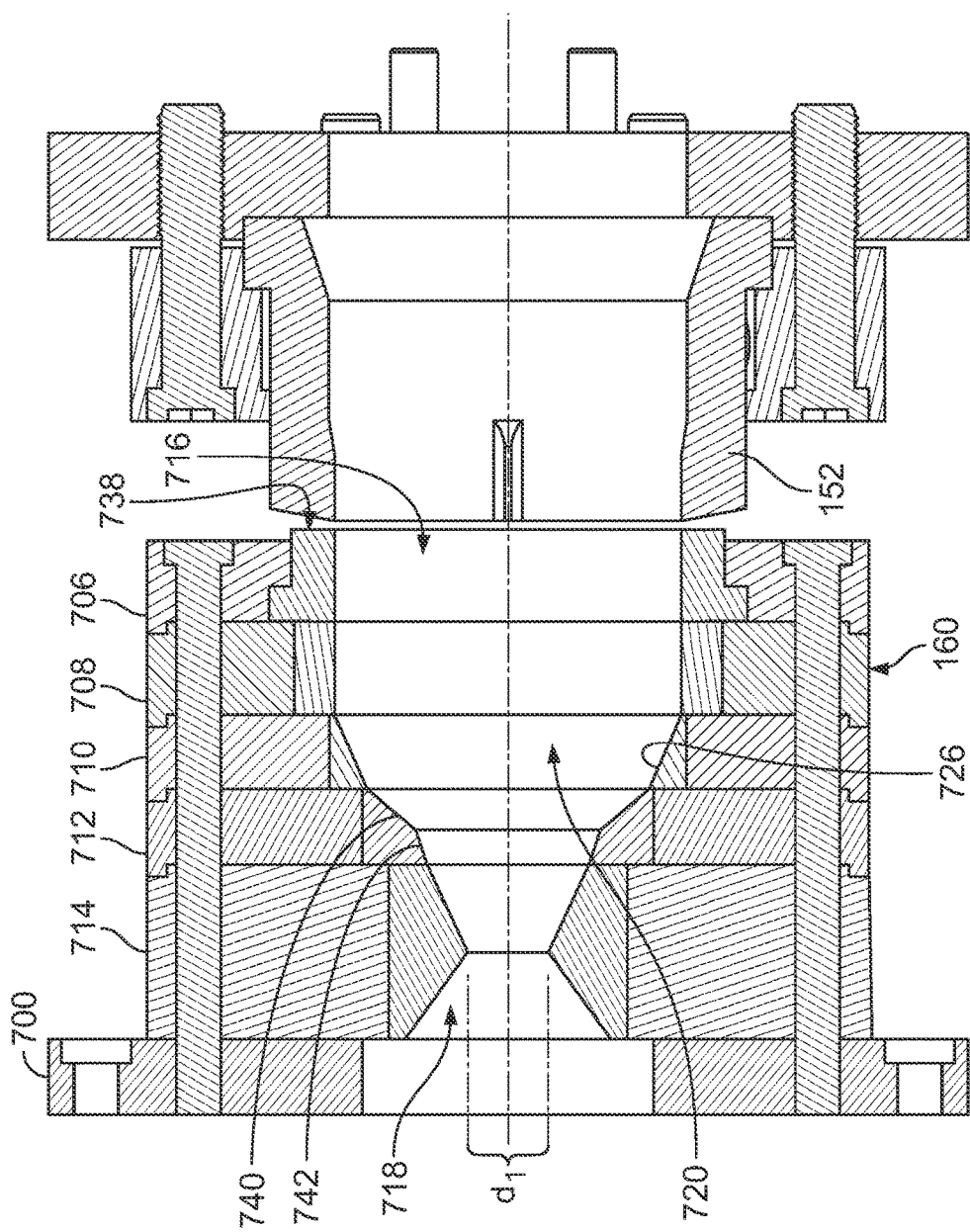
FIG. 26 shows an illustrative cross-sectional view of the rotating die and centering ring of FIG. 24.

FIG. 26 shows the die 160 in an alternate construction of die plates that form the body of the die 160. The die 160 in FIG. 26 includes a steel end holder 706, an entry plate 708, a first intermediate plate 710, a second intermediate plate 712, and an exit plate 714. Each plate includes a bore through the center of the plate, and the bores are stacked adjacent one another to form the interior passage 720 of the die 160. The interior surfaces surrounding the bores of the plates are angled to form the profile of the inner surface 726 and narrow the interior passage 720 from the entrance 716 to the exit 718. One potential advantage of using the plate construction is the ability to exchange individual plates when areas of the inner surface 726 begin to wear, rather than having to replace the full die 160. To reduce the effects of wear on the plates, each plate may also be constructed from two different materials, with one material outlining the center bore of the plate and forming the inner surface 726 and a second material forming an outer perimeter of the plate. Wear-reducing materials, such as ceramic materials or steel, may be used to form the bore perimeter, or a consumable material may be used and periodically replaced. Because the centering insert 152 does not rotate when the die 160 rotates, the material surrounding the bore in steel end holder 706 and forming the front face 738 of the die 160 may be the same as or similar to the material of the centering insert 152 to reduce the effect of wear as the two materials come into contact during extrusion.

To reduce the cost-increasing effect of the friction wear on each of the plates in the die 160, the plates may be designed to focus the wear on one or more plates that are replaced more often than the remaining plates. Such a design may allow the die to be operated by producing multiple copies of a single plate and a single plate for the rest of the plates in the stack. For example, in the stack shown in FIG. 26, the second intermediate plate 712 exhibits a non-uniform surface profile around the center bore through the plate. The inner surface of plate 712 includes a first portion 740 that is angled at a sharper angle than the other inner surfaces in the die plate stack and a second portion 742 that is angled similarly to other inner surfaces in the stack. The sharp angle of the first portion 740 creates a greater decrease in diameter at that section of the inner surface relative to the other plates in the stack, and thus creates a greater friction force and potential for wear at the first portion 740. This wear may be decreased by positioning a corresponding angled portion of a mandrel bar within the passage 720 near the portion 740 to further reduce costs created by the need to replace the plate 712. In certain implementations, the angle of the bore perimeter on each plate may increase from the back face of first plate to the front face of the next plate towards the exit of the die. For example, in FIG. 26, the angle of each inner perimeter near the front face of each plate is greater than the angle of the inner surface near the back face of the adjacent plate positioned nearer the entrance of the die. This design may be desired, for example, to focus work and stress towards the exit of the die 160, and may result in a need to replace plates near the exit 718, for example plates 714 and 712, more often than plates that are nearer the entrance 716.

In addition to focusing work and stress within the die 160, mechanical and thermal properties of the billet materials may dictate the number and design of plates in a die assembly. For example, a billet material having high thermal conductivity may heat up to a deformable temperature more quickly than a material having a low thermal conductivity, and thus a shorter die with fewer plates may be used for the high conductivity material. In addition, the tapering angles of the inner surface of a die may be greater for the high conductivity material as a result of the quicker heating of the billet. In other implementations, dies of equal size having the same number of plates may be used, and the tapering angles of the dies may differ to accommodate the different thermal properties and heat the billets to a deformable temperature while still focusing work and wear to a desired area of the die surface and the surface of a mandrel tip within the die, or while spreading the work and wear over the surfaces.

Whether a unibody or die plate stack die is implemented, a billet pressed through the die 160 produces an extruded tube product through exit 718 of the die 160 having an outer diameter that is similar to the diameter d1, the diameter at the narrowest portion of interior passage 720. The inner diameter of the extruded product is selected by advancing the mandrel bar 100 into the die 160 with a mandrel bar tip, such as mandrel bar tip 800, having an end dimension selected to create the inner diameter of the tube product at the end of the mandrel bar 100.

Figure 27:
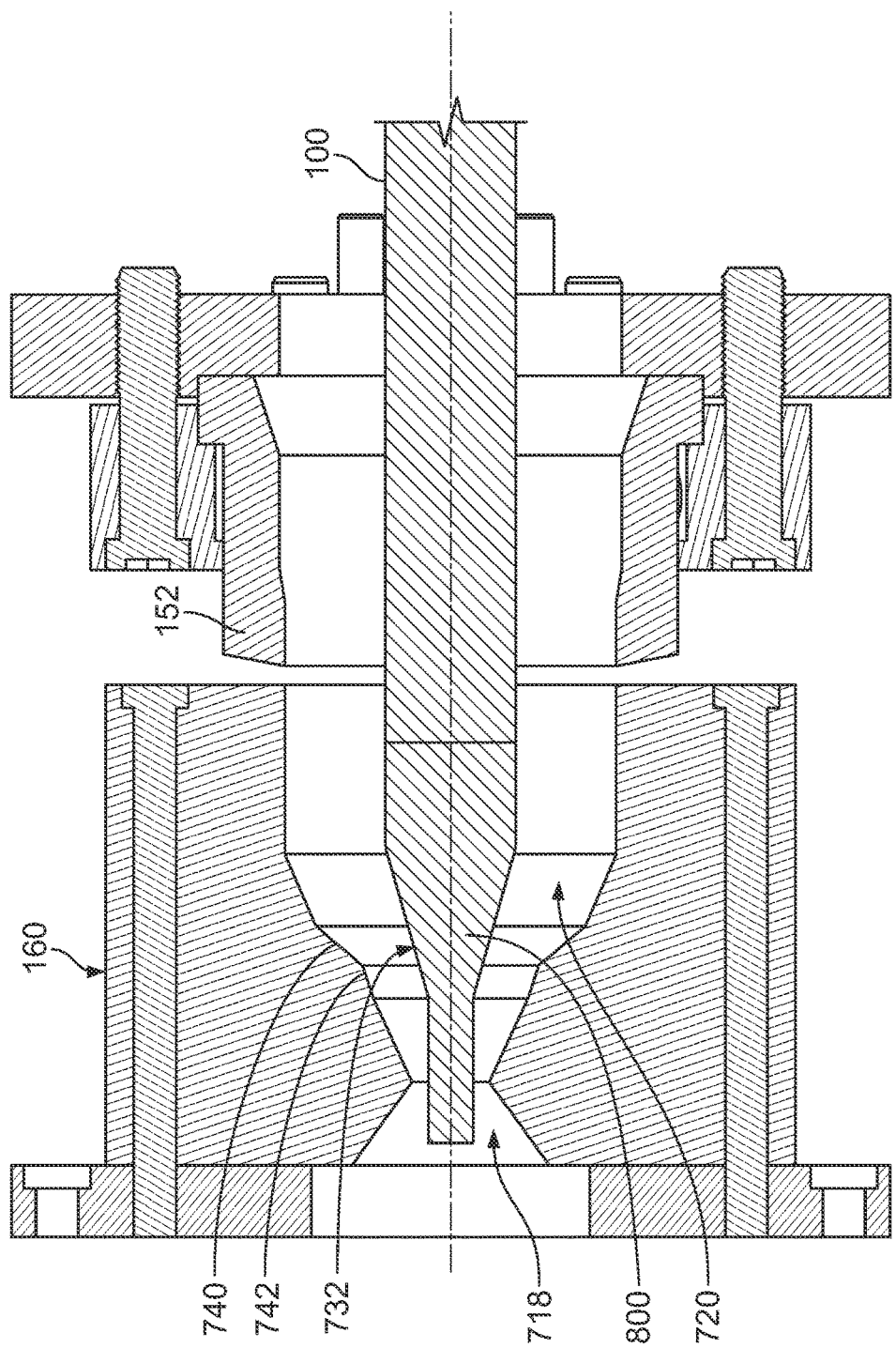
FIG. 27 shows a cross-sectional view the rotating die of FIG. 24 with a mandrel bar positioned therein.

FIG. 27 shows the die 160 with the mandrel bar 100 and mandrel bar tip 800 advanced through the centering insert 152 and into the center passage 720 of the die 160. As discussed above with respect to FIG. 1, gripping elements in an extrusion press system may be used to hold the mandrel bar 100 and in the orientation shown in FIG. 27 and to resist rotation while the die 160 is rotated and a billet passes over the mandrel bar 100.

Figure 28:
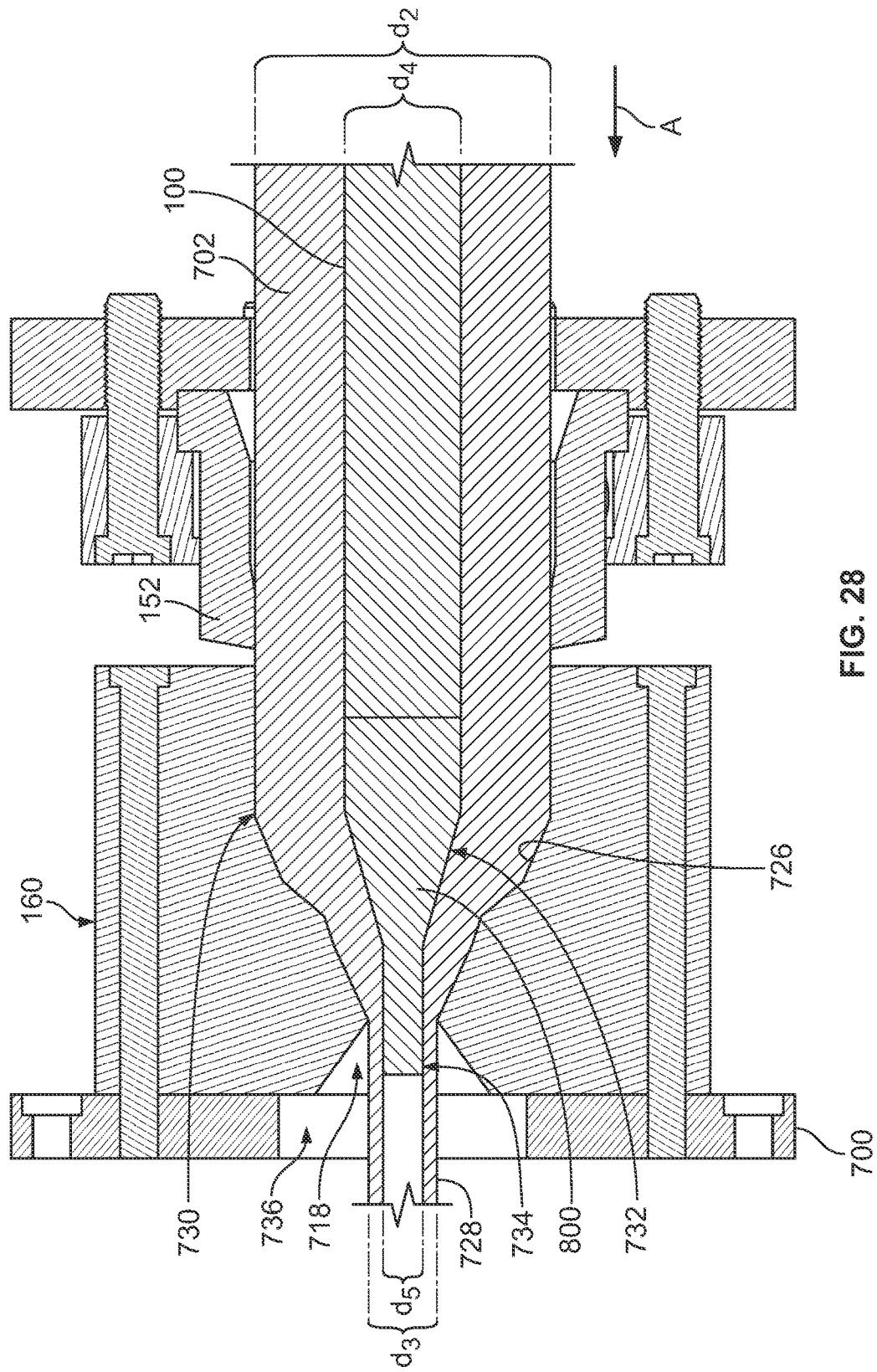
FIG. 28 shows a cross-sectional view of a billet being extruded through the rotating die of FIG. 27.

FIG. 28 shows the die and mandrel bar configuration of FIG. 27 as the billet 702 is passed through the die 160 and extruded to form tubing 728. During extrusion, the die 160 is rotated while the mandrel bar 100 and centering insert 152 are held stationary. The billet 702 is pressed into the die 160 in the direction of arrow A and contacts the interior surface 726 of the die 160 at a first contact point 730. The interference contact between the interior surface 726 and the billet 702 begins at the contact point 730 and generates the energy that heats the billet 702 to a plastic deformable temperature. The design of the inner surfaces and the profile of the interior die surface may differ for different applications, and in particular for the extrusion of different materials. Depending on the material properties of billets used for extrusion, for example heat transfer properties that may affect the heating of the billets during extrusion, the inner profile of die plates in a die body may be varied to focus or spread work and wear over the die plates. In addition, the die rotation speed may be varied for a particular extrusion to increase the efficiency of the die and avoid exceeding material properties of the billets. For example, a die rotation speed between about 200 rpm and about 1000 rpm may be used. In certain implementations, a slower rotation speed, for example about 300 rpm, may be desired to avoid applying a high level of torsional sheer to a billet while still heating the billet to a sufficient temperature for deformation. A faster speed, for example about 800 rpm, may be used for a material that is not adversely affected by a higher torsional sheer or that requires more energy, and thus greater friction, to heat to a deformation temperature. In other implementations, die rotation speeds in excess of 100 rpm may be desired for extrusion.

As the billet 702 is advanced over the middle portion 732 of the mandrel bar tip 800, the taper of the interior surface 726 applies a compression force to the outer surface of the billet 702 that presses the billet 702 inwards towards the mandrel bar tip 800. Because the billet 702 is in a plastic deformation state, the material in the billet extrudes in the direction of end portion 734 of mandrel bar tip 800 as the die 160 decreases the outer diameter of the billet 702 from the original diameter d2 to a final outer diameter d3. When the billet 702 reaches the middle portion 732, the taper of the mandrel bar tip 800 towards the end portion 734 causes the inner diameter of the billet 702 to extrude and decrease from the original diameter d4 as the billet advances further over the mandrel bar tip 800. The tapered surface of the mandrel bar tip 800 in the middle portion 732 may be positioned near a sharp angled portion of the inner surface 726, for example near a first sharp angle portion 740, as discussed above with respect to second intermediate plate 712. This orientation positions the tapered middle portion 732, and the area in which the inner diameter of a billet passing over the mandrel bar tip 800 is decreased, in the same location as the greatest compression force produced by inner surface 726 over die 160.

When the extruding billet 702 reaches the end portion 734, the inner diameter of the billet is reduced from the original diameter d4 to the final diameter d5 of the end tubing product 728. As the billet 702 passes over the end portion 734, the outer diameter of the billet 702 continues to decrease to the final outer diameter d3 when the extruded tubing product 728 exits the die at exit 718. At the point of exit, the formation of the extruded product 728 is complete. Due to the friction and heating within the die 160, the product 728 is at a heightened temperature upon exit from the die 160, and a cooling element may be applied to prevent further deformation or increase operational safety of the extrusion press, eliminate the escape of extruded material, or maintain desired material characteristics. A bore 736 in the base plate 700 is shown in FIG. 28 with a diameter larger than the diameter of the die exit 718. This configuration may be preferable in order to allow cooling elements and cooling fluid to reach into the base plate 700 and contact the extruded product 728 as soon as it exits the die 160 for earlier cooling. After the product 728 exits the base plate 700 and passes through a cooling system, the extrusion process is complete, and the product 728 may be gathered for post-processing.

Figure 29:
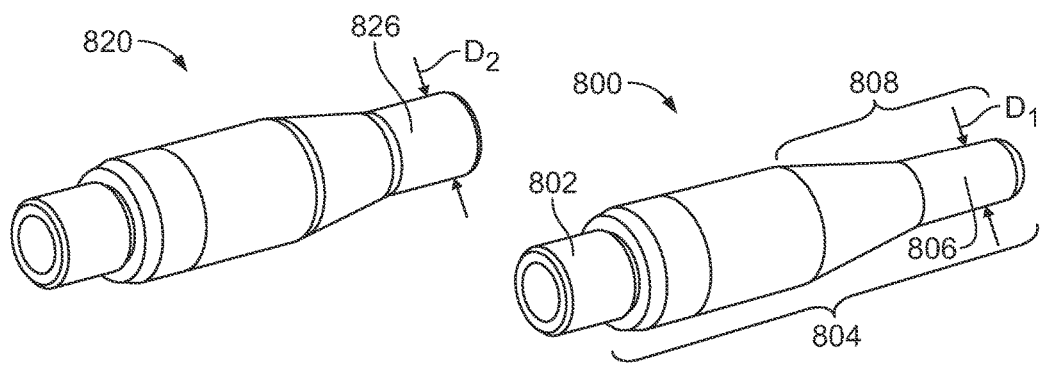
FIGS. 29 and 30 show a perspective view and a top plan view, respectively, of illustrative mandrel bar tips.
Figure 30:
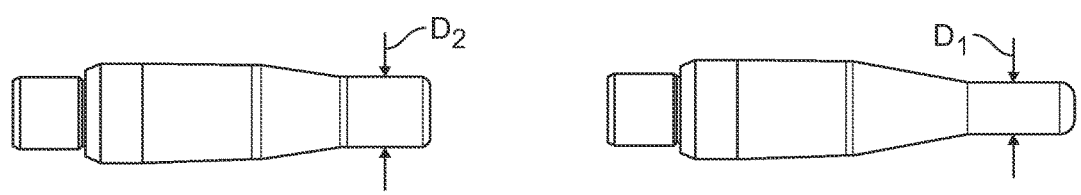

FIGS. 29 and 30 show a perspective view and a top plan view, respectively, of mandrel bar tips according to certain embodiments. Mandrel bar tip 800 includes a connector 802 that couples with a mandrel bar to form the mandrel bar tip of the mandrel bar. The mandrel bar tip 800 also includes various extrusion contact surfaces 804 that contact the inner surface of a hollow billet as the billet passes over the mandrel bar tip 800, which is positioned within a rotating die. The mandrel bar tip 800 has a terminal contact surface 806 with a diameter D1 that sets the inner diameter of the extruded tubing. During the extrusion process, the rotating die rotates against the billet and thereby generates heat, which softens the billet to allow for plastic deformation of the billet. During operation of the extrusion press system 10, the combination of the rotating die 160 and the mandrel bar tip 800 causes the plastic deformation zone of the billet to generally occur in the plastic deformation zone 808 of the mandrel bar tip 800.

The mandrel bar tip 800 may have any suitable diameter along the extrusion surfaces 804 as well as the terminal contact surface 806. For example, in certain embodiments, as shown by mandrel bar tip 820, the terminal contact surface 826 may have a setting diameter D2 that is relative larger than the setting diameter D1 of mandrel bar tip 800. In certain embodiments, each of the contact surfaces 804 of the mandrel bar tip 800 may correspond to the respective profile of the various die plates within the rotating die.

Figure 31:
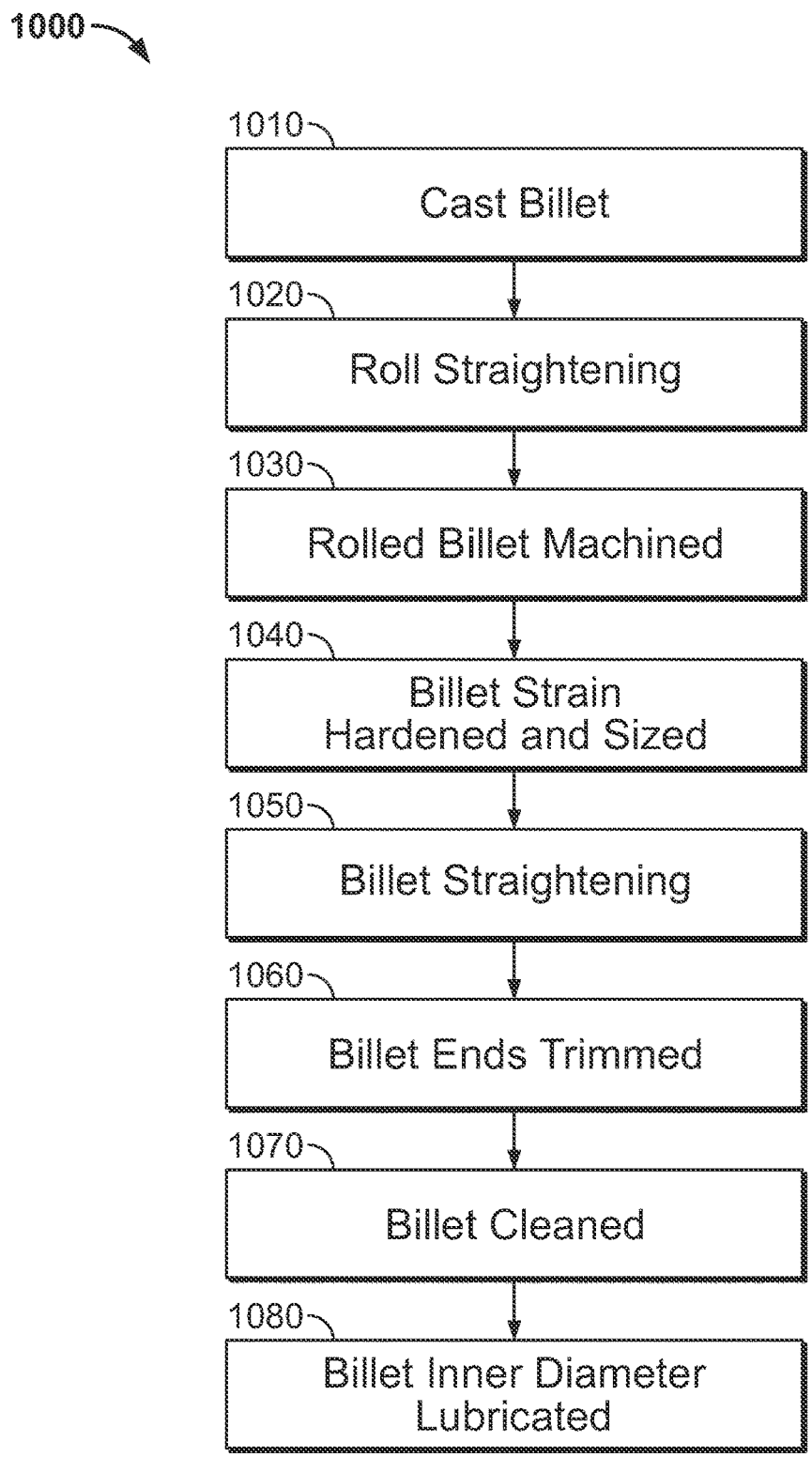
FIG. 31 shows an illustrative flowchart for pre-processing a billet for use in the extrusion press system of FIG. 1.

FIG. 31 shows a flowchart for pre-processing a billet for use in the extrusion press system 10 of FIG. 1 according to certain embodiments. At step 1010, the billet is cast using any suitable casting process. For example, casting a billet may include the use of a casting furnace for producing a billet of desired proportions. The cast billet may then be straightened using a roll straightening process at step 1020, followed by machining the rolled billet at step 1030. Machining the rolled billet includes, for example, clearing any rough edges or surfaces of the billet. At step 1040, the machined billet may be strain hardened and sized. Strain hardening may include compressing the billet to induce strain hardening effects that allow the billet to withstand the pressing forces exerted onto the billet during the extrusion process by press-rams (e.g., press-ram platens 130, 140 of FIG. 1), as well as the rotation and shear stresses induced by a rotating die (e.g., rotating die 160 of FIG. 1). At step 1050 the billet may again be straightened using any suitable straightening device. At step 1060 the billet ends are trimmed. The trimming allows for removing imperfections or other deformations at the ends of the billet, for example, that may have been introduced during the prior processing steps or during casting. The billet may then be cleaned at step 1070 using any suitable cleaning solution such as a water soluble degreasing solution or combination of cleaning solutions. At step 1080 the inner diameter of the billet may be lubricated with any suitable lubrication fluid including graphite lubricants, petroleum-based composites or non-petroleum synthesized compounds, any other suitable lubrication fluid or combinations thereof.

Figure 32:
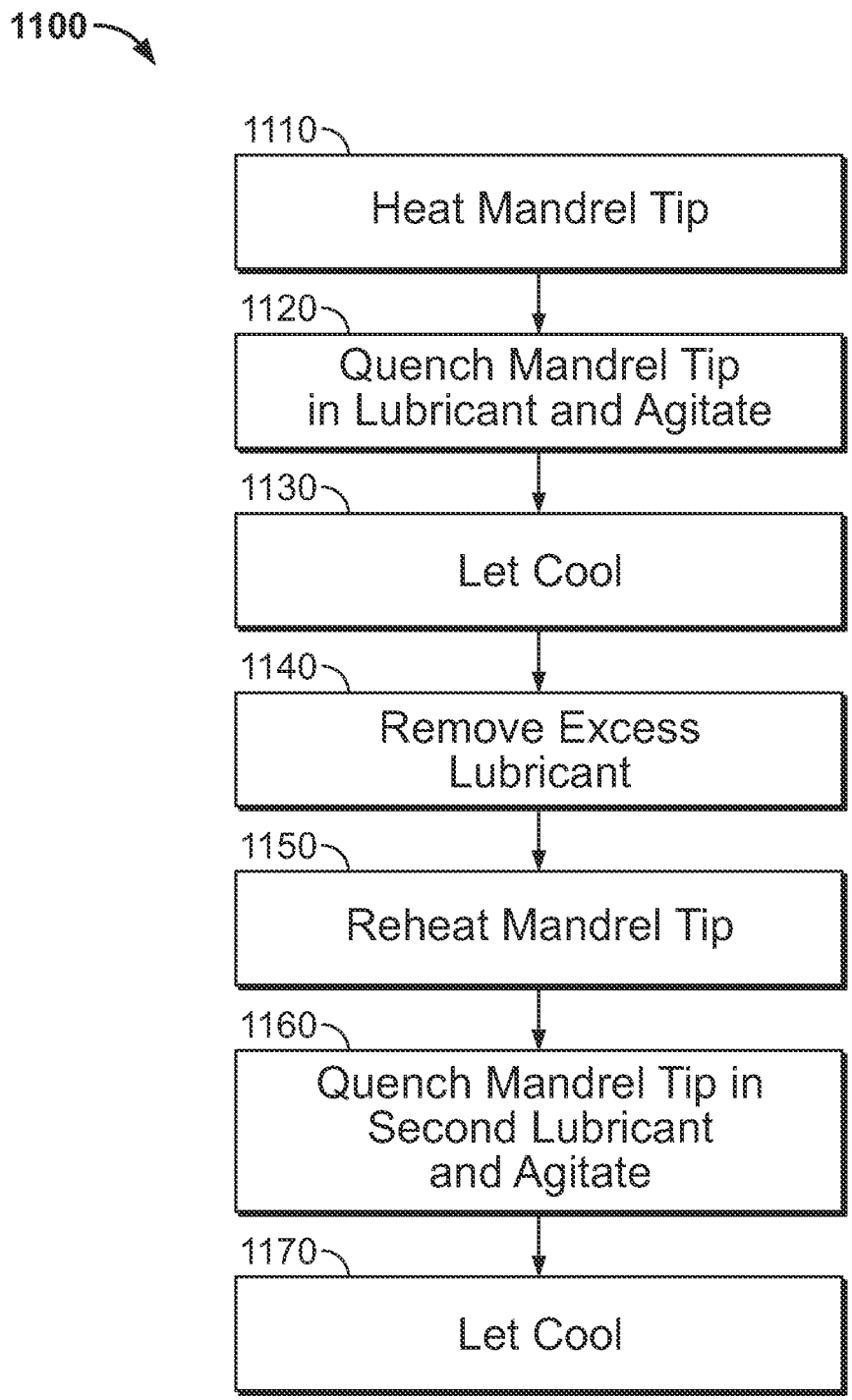
FIG. 32 shows an illustrative flowchart for pre-processing a mandrel bar tip for use in the extrusion press system of FIG. 1.

FIG. 32 shows a flowchart for pre-processing a mandrel bar tip, such as the mandrel bar tip 800 or 820 of FIGS. 28 and 29, for use in the extrusion press system 10 of FIG. 1 according to certain embodiments. At step 1110, the mandrel bar tip may be heated using any suitable heating process. For example, the mandrel bar tip may be placed in a furnace or heated with a blowtorch until the mandrel bar tip is greater than approximately 1,000 degrees Fahrenheit. Following this heat treatment, at step 1120, the mandrel bar tip may be quenched in lubricant and agitated to ensure a consistent deposit of the lubricant. In certain embodiments the lubricant is a graphite lubricant, although any other suitable lubricant or combinations thereof may be used. At step 1130, the mandrel bar tip is allowed to cool after quenching. At step 1140, any excess lubricant is removed from the mandrel bar tip. The mandrel bar tip is then be reheated at step 1150 to greater than approximately 1,000 degrees Fahrenheit and quenched in lubricant and agitated at step 1160 to ensure a consistent deposit of the lubricant. In certain embodiments, the mandrel bar tip is quenched using a second lubricant that is different than the first lubricant used in step 1120. For example, the lubricant used in step 1120 may be a graphite lubricant and the lubricant used in step 1160 may be a petroleum-based composite or non-petroleum synthesized compound, or any other suitable lubricant that is different than the first lubricant. In certain embodiments, the lubricant used in step 1160 may be the same as that used in step 1120. At step 1170, the mandrel bar tip is allowed to cool after the quenching step 1160. In certain embodiments, after completing process step 1170, the process steps 1150, 1160, and 1170 may be repeated. In such embodiments, the lubricant used in the repeated quenching step may be the same as that used in the prior step 1160, which lubricant may be the same as or different than that used in the first quenching step 1120.

FIGS. 33-36 show various flowcharts depicting processes for operating an extrusion press system, such as the extrusion press system 10 of FIG. 1, according to certain embodiments. Steps 1210 through 1240 depict certain exemplary steps of the billet delivery subsystem 20 of the extrusion press system. Step 1250 depicts certain exemplary steps of the extrusion subsystem 40 of the extrusion press system, and step 1260 depicts certain exemplary steps of the quenching subsystem 60 of the extrusion press system. It will be understood that the steps of the flowcharts of this disclosure are merely illustrative. Any of the steps of the flowcharts may be modified, omitted, or rearranged, two or more of the steps may be combined, or any additional steps may be added, without departing from the scope of the present disclosure.

Process 1200 begins at step 1210, where one or more billets are loaded about the receiving end 100a of the mandrel bar near the first or upstream fluid clamp 102. Each of the billets of the present disclosure is hollow along the length of the billet, which allows the billets to be placed onto the stationary mandrel bar 100 such that the billet moves and is transported along and about the mandrel bar 100. In certain embodiments, the billet delivery subsystem 20 of the extrusion press system 10 may include a billet delivery table with a plurality of billets prepped for loading onto the extrusion press system 10. The billets may be loaded automatically by an automated process or may be loaded by hand. Once loaded, the billets may be transported along the mandrel bar by a billet feed track assembly such as the track assembly 110 shown in FIG. 2, which includes a track 202 that intermittently moves depending on the position of particular billets relative to the fluid clamps 102, 104 and the mandrel grips 106, 108.

Figure 34:
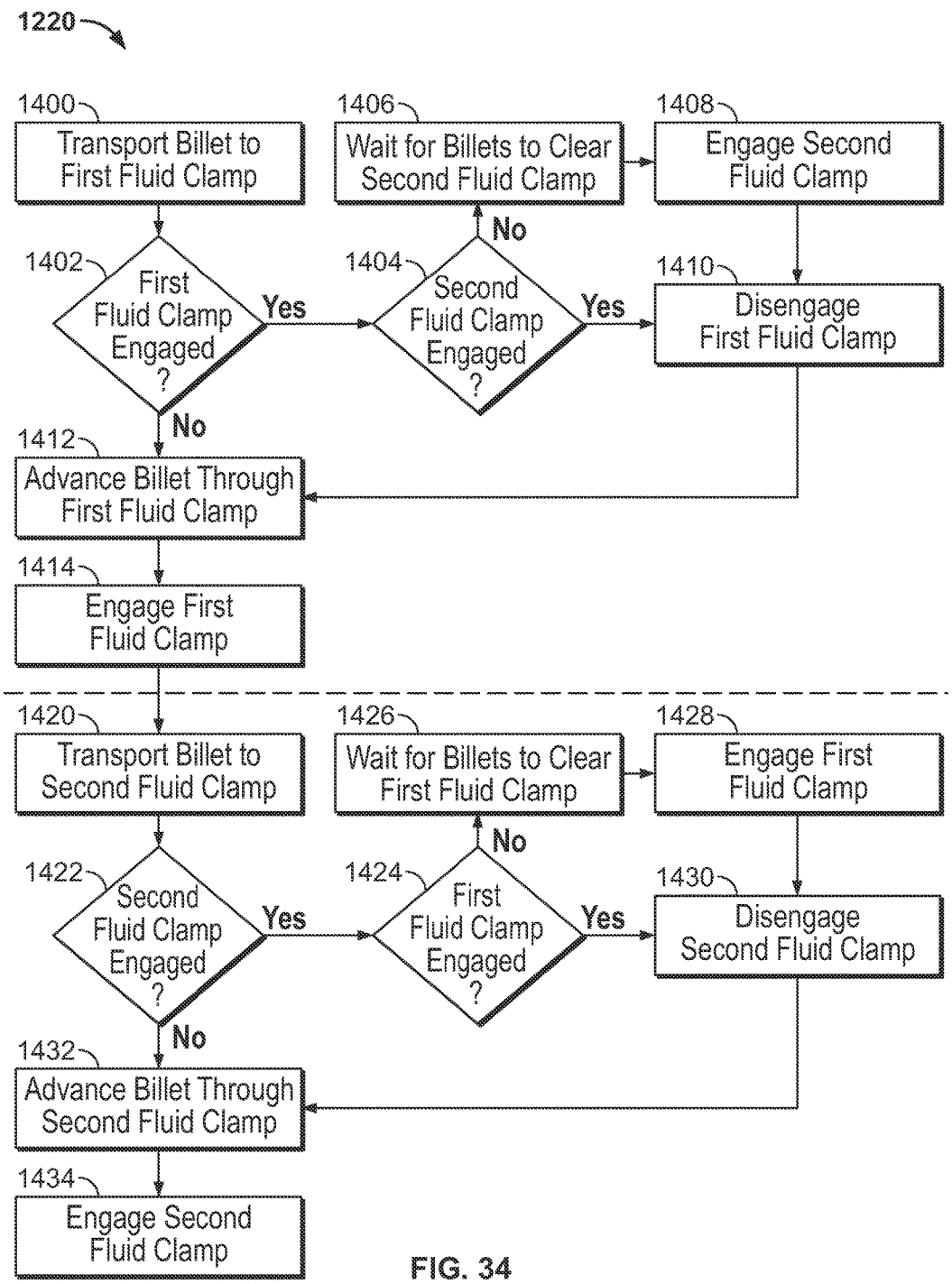

At step 1220 the billets are transported along the mandrel bar and through the fluid clamps, which when engaged to the mandrel bar deliver cooling fluid to the mandrel bar tip. At any given time, at least one of the fluid clamps is preferably clamped to or otherwise engaged with the mandrel bar to provide a continuous or substantially continuous delivery of cooling fluid to the mandrel bar. The steps for passing one or more billets through the respective fluid clamps of the extrusion press system are shown in FIG. 34. For example, at step 1400, one or more billets are transported to a first upstream fluid clamp such as fluid clamp 102 of extrusion press system 10. The PLC system determines whether the first fluid clamp is engaged with the mandrel bar at decision block 1402. If the first fluid clamp is engaged with the mandrel bar, the PLC system then determines whether the second fluid clamp is engaged with the mandrel bar at decision block 1404. In certain embodiments, both fluid clamps may be engaged with the mandrel bar when billets are not being passed through the fluid clamps. If the second fluid clamp is engaged, then at step 1410 the first fluid clamp is disengaged. However, if the second fluid clamp is not engaged, at step 1404, the PLC system determines that the second fluid clamp is transporting billets therethrough and waits for the billets to clear the second fluid clamp at step 1406. Then at step 1408 the second fluid clamp is engaged and the process continues to step 1410 where the first fluid clamp is disengaged. After the first fluid clamp is disengaged at step 1410, or if the first fluid clamp was already determined to be disengaged at decision block 1402, the process continues to step 1412 where one or more billets are advanced through the first fluid clamp. While the first fluid clamp is disengaged to allow the billets to pass therethrough, the second fluid clamp is engaged to the mandrel bar and delivering cooling fluid to the mandrel bar. After a desired number of billets have been advanced through the first fluid clamp, the first fluid clamp is engaged with the mandrel bar at step 1414 and the billets are transported to the second fluid clamp at step 1420.

The process 1220 with respect to the second fluid clamp is substantially similar to that performed by the PLC system for the first fluid clamp and is also shown in FIG. 34. At step 1420, one or more billets are transported to a second, downstream fluid clamp such as fluid clamp 104 of extrusion press system 10. The PLC system determines whether the second fluid clamp is engaged with the mandrel bar at decision block 1422. If the second fluid clamp is engaged with the mandrel bar, the PLC system then determines whether the first fluid clamp is engaged with the mandrel bar at decision block 1424. In certain embodiments, both fluid clamps may be engaged with the mandrel bar when billets are not being passed through the fluid clamps. If the first fluid clamp is engaged, then at step 1430 the second fluid clamp is disengaged. However, if the first fluid clamp is not engaged, at step 1424, the PLC system determines that the first fluid clamp is transporting billets therethrough and waits for the billets to clear the first fluid clamp at step 1426. Then at step 1428 the first fluid clamp is engaged and the process continues to step 1430 where the second fluid clamp is disengaged. After the second fluid clamp is disengaged at step 1430, or if the second fluid clamp was already determined to be disengaged at decision block 1422, the process continues to step 1432 where one or more billets are advanced through the second fluid clamp. While the second fluid clamp is disengaged to allow the billets to pass therethrough, the first fluid clamp is engaged to the mandrel bar and delivering cooling fluid to the mandrel bar. After a desired number of billets have been advanced through the second fluid clamp, the second fluid clamp is engaged with the mandrel bar at step 1434.

Figure 33:
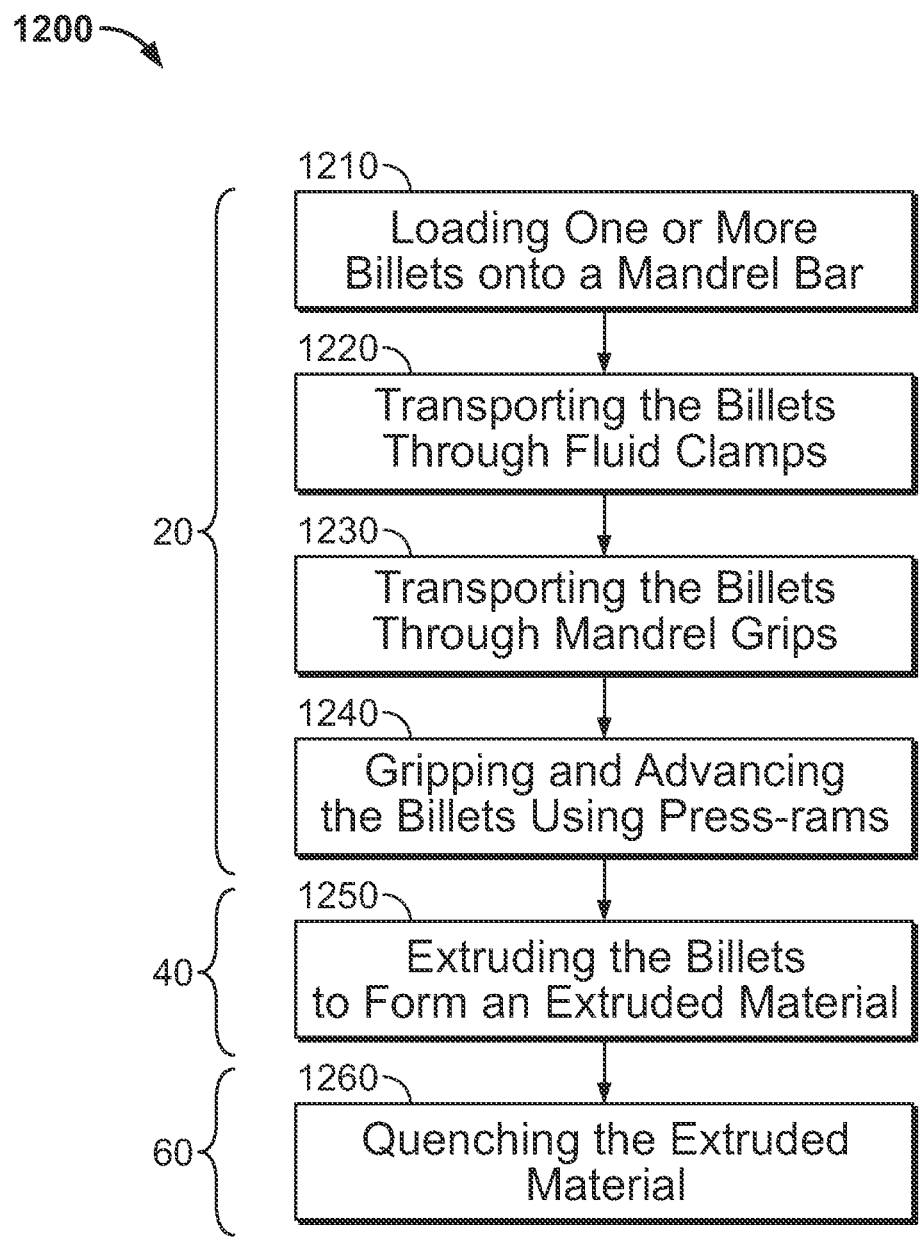
FIGS. 33-36 show illustrative flowcharts for operating the extrusion press system of FIG. 1.
Figure 35:
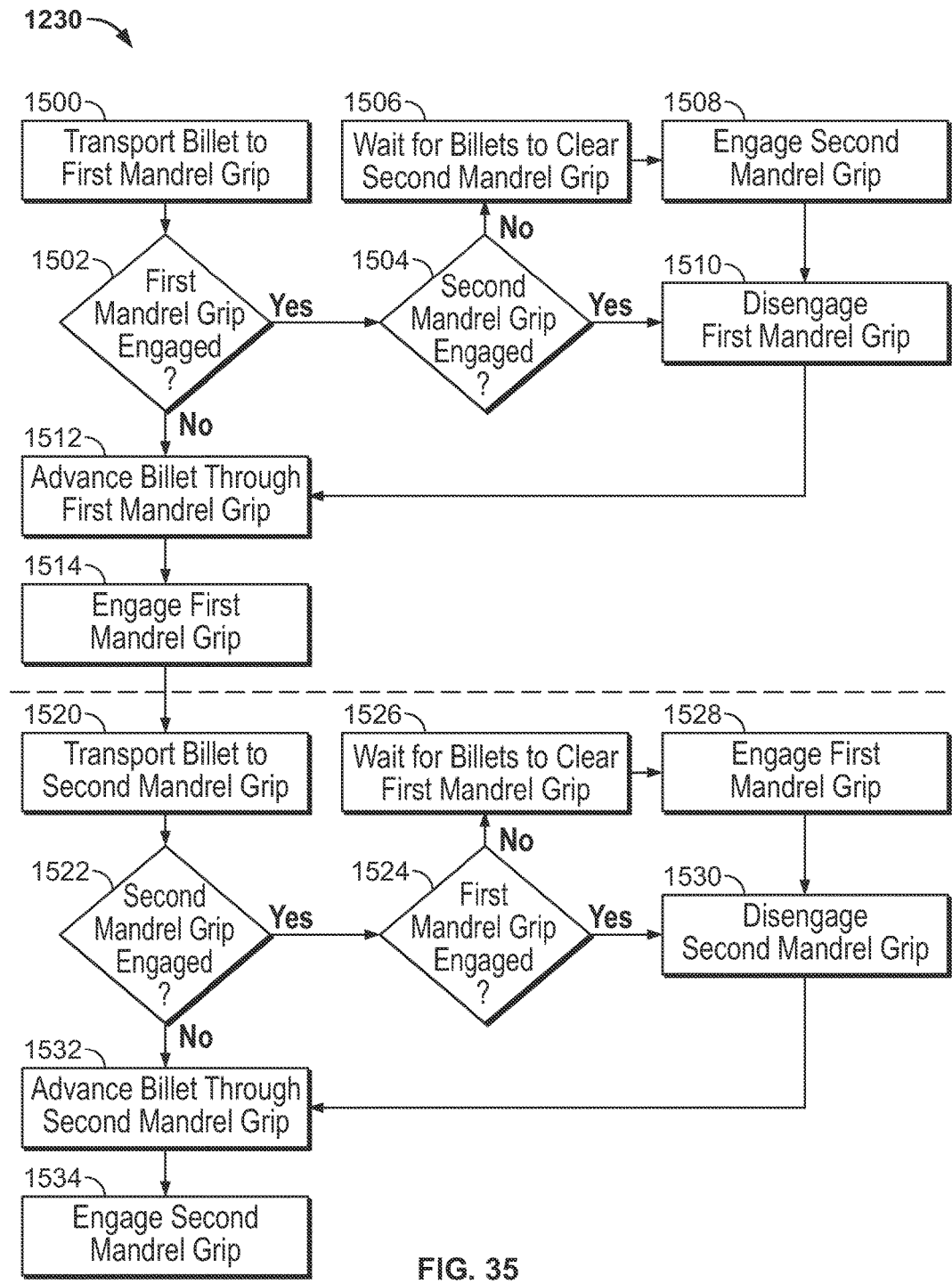

Returning to process 1200 of FIG. 33, at step 1230 the billets are transported along the mandrel bar and through mandrel grips, which when engaged to the mandrel bar secure the mandrel bar in place and prevent rotation of the mandrel bar. At any given time, at least one of the mandrel grips is preferably clamped to or otherwise engaged with the mandrel bar. The steps for passing one or more billets through the respective mandrel grips of the extrusion press system are shown in FIG. 35. For example, at step 1500, one or more billets are transported to a first upstream mandrel grip such as mandrel grip 106 of extrusion press system 10. The PLC system determines whether the first mandrel grip is engaged with the mandrel bar at decision block 1502. If the first mandrel grip is engaged with the mandrel bar, the PLC system then determines whether the second mandrel grip is engaged with the mandrel bar at decision block 1504. In certain embodiments, both mandrel grips may be engaged with the mandrel bar when billets are not being passed through the mandrel grips. If the second mandrel grip is engaged, then at step 1510 the first mandrel grip is disengaged. However, if the second mandrel grip is not engaged, at step 1504, the PLC system determines that the second mandrel grip is transporting billets therethrough and waits for the billets to clear the second mandrel grip at step 1506. Then at step 1508 the second mandrel grip is engaged and the process continues to step 1510 where the first mandrel grip is disengaged. After the first mandrel grip is disengaged at step 1510, or if the first mandrel grip was already determined to be disengaged at decision block 1502, the process continues to step 1512 where one or more billets are advanced through the first mandrel grip. While the first mandrel grip is disengaged to allow the billets to pass therethrough, the second mandrel grip is engaged to the mandrel bar. After a desired number of billets have been advanced through the first mandrel grip, the first mandrel grip is engaged with the mandrel bar at step 1514 and the billets are transported to the second mandrel grip at step 1520.

The process 1230 with respect to the second mandrel grip is substantially similar to that performed by the PLC system for the first mandrel grip and is also shown in FIG. 35. At step 1520, one or more billets are transported to a second, downstream mandrel grip such as mandrel grip 108 of extrusion press system 10. The PLC system determines whether the second mandrel grip is engaged with the mandrel bar at decision block 1522. If the second mandrel grip is engaged with the mandrel bar, the PLC system then determines whether the first mandrel grip is engaged with the mandrel bar at decision block 1524. In certain embodiments, both mandrel grips may be engaged with the mandrel bar when billets are not being passed through the mandrel grips. If the first mandrel grip is engaged, then at step 1530 the second mandrel grip is disengaged. However, if the first mandrel grip is not engaged, at step 1524, the PLC system determines that the first mandrel grip is transporting billets therethrough and waits for the billets to clear the first mandrel grip at step 1526. Then at step 1528 the first mandrel grip is engaged and the process continues to step 1530 where the second mandrel grip is disengaged. After the second mandrel grip is disengaged at step 1530, or if the second mandrel grip was already determined to be disengaged at decision block 1522, the process continues to step 1532 where one or more billets are advanced through the second mandrel grip. While the second mandrel grip is disengaged to allow the billets to pass therethrough, the first mandrel grip is engaged to the mandrel bar. After a desired number of billets have been advanced through the second mandrel grip, the second mandrel grip is engaged with the mandrel bar at step 1534.

Figure 36:
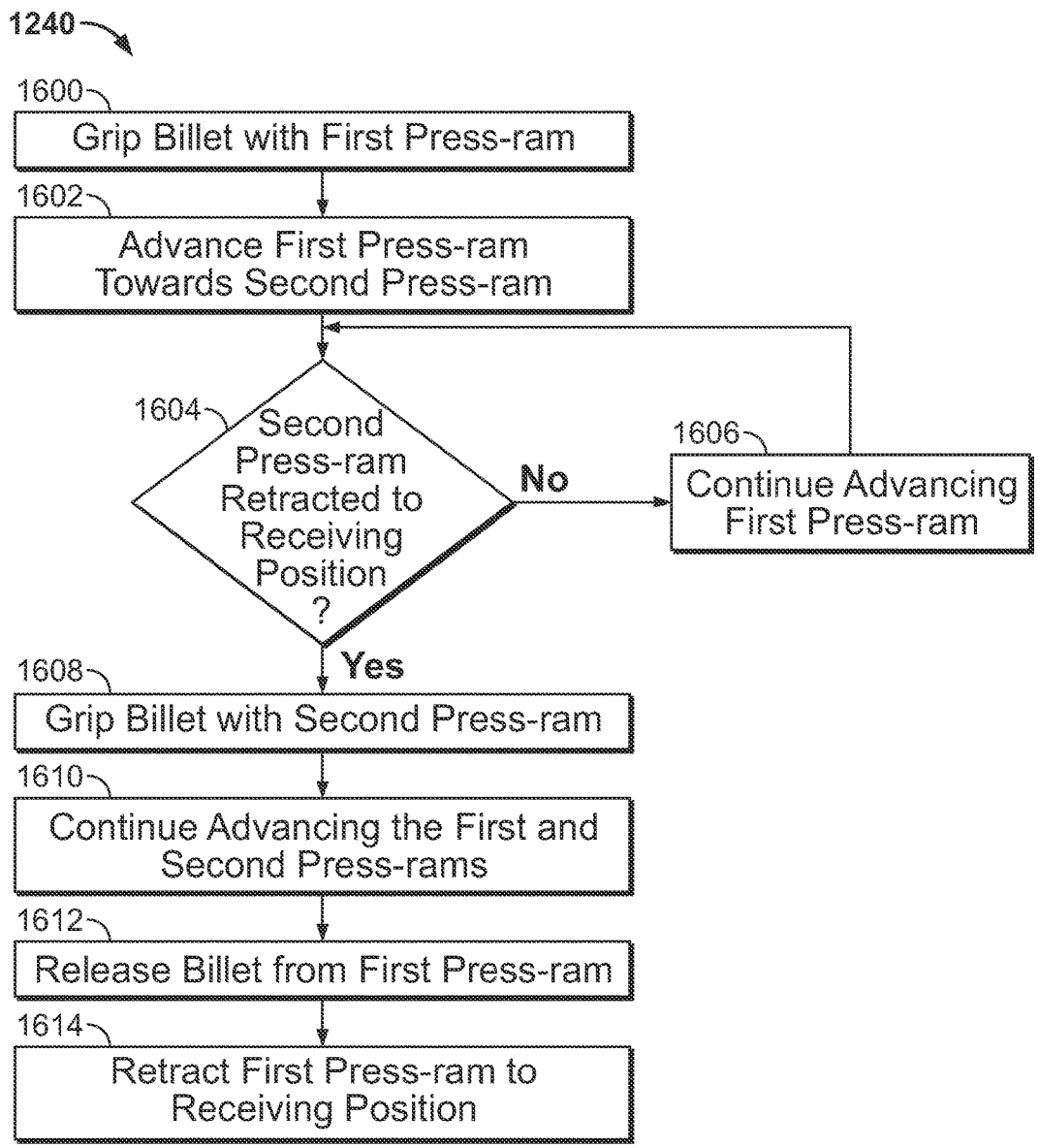

Returning to process 1200 of FIG. 33, at step 1240 the billets are gripped and then advanced using press-rams. The press-rams provide a substantially constant pushing force against the gripped billets in a direction toward the rotating die. The PLC system controls the rate at which the press-rams operate and thereby controls the entry of billets into the rotating die. The steps for grabbing and advancing billets using press-rams of the extrusion press system are shown in FIG. 36. For example, at step 1600 a billet is gripped by a first, upstream press-ram such as press-ram 130 of the extrusion press system of FIG. 1. The first press-ram is advanced toward a second, downstream press-ram at step 1602. The PLC system determines whether the second press-ram has been retracted to a receiving position to receive the billet at decision block 1604. If the second press-ram is not in position then at step 1606 the first press-ram continues advancing the billet until the second press-ram is in position. If the second press-ram is in position, at step 1604, then the billet is gripped by the second press-ram at step 1608. The first and second press-rams continue advancing the billet together at step 1610. This may ensure that a continuous or substantially continuous pushing force is applied to the billet in the direction of the rotating die. At step 1612 the first press-ram releases the billet (while the second press-ram continues to advance the billet) and at step 1614 the first press-ram is retracted to a receiving position to thereby grab a subsequent billet. This arm-over-arm process allows the rotating die to receive a constant stream of billets at a determined feed rate. Prior to the first press-ram gripping the billet at step 1600, the feed track assembly may continuously index the track to minimize the gaps between adjacent billets queued to be advanced by the press-rams.

At step 1250 the billets are extruded to form an extruded material. The press-rams of step 1240 advance billets through a centering insert (e.g., centering insert 152 of FIG. 1) having a plurality of notches that prevent the billets from rotating prior to entry of the billets into the rotating die. Once a billet enters the rotating die, the die simultaneously heats the billet and sets the outer diameter of the billet as the billet is extruded to form the extruded material. The mandrel bar is positioned to place the mandrel bar tip within the rotating die. The mandrel bar tip sets the inner diameter of the extruded material. The position of the mandrel bar with respect to the die can be controlled by the PLC system. The PLC system can also control the rotation speed of the rotating die using a motor 170 coupled to the spindle 172.

At step 1260 the extruded material is quenched as it exits the rotating die. This step includes rapidly cooling the extruded material by spraying cooling fluid such as water, or any other suitable cooling fluid, at a high velocity from a quench tube onto the extruded material. Despite the temperatures generated during the extrusion process of step 1250, upon exiting the quench tube, the extruded material is relatively cool enough to the touch that it can be handled without causing burns. Furthermore, in certain embodiments, nitrogen gas, or another suitable inert gas, is delivered to the interior of the extruded material as the material exits the rotating die. For example, nitrogen gas may be delivered to the interior of extruded tubing using a cap placed on the tubing as it exits the rotating die. Injecting gaseous or liquid nitrogen into the rotating die assembly, or the interior of the extruded material itself, can minimize oxide formation by displacing the oxygen-laden air.

It will be understood that as one or more billets proceed through the process 1200 thus described, other billets may be advancing through the extrusion press system at any of the other steps of the process 1200. For example, as a first set of billets, including one or more billets, is transported through the fluid clamps at step 1220, another set of billets, including one or more billets, may be contemporaneously loaded onto the mandrel bar at step 1210 or transported through mandrel grips at step 1230 or any other step appearing in process 1200. In this way the extrusion press system is operable to continuously feed a plurality of billets into a rotating die to extrude the billets to form an extruded material.

Figure 37:
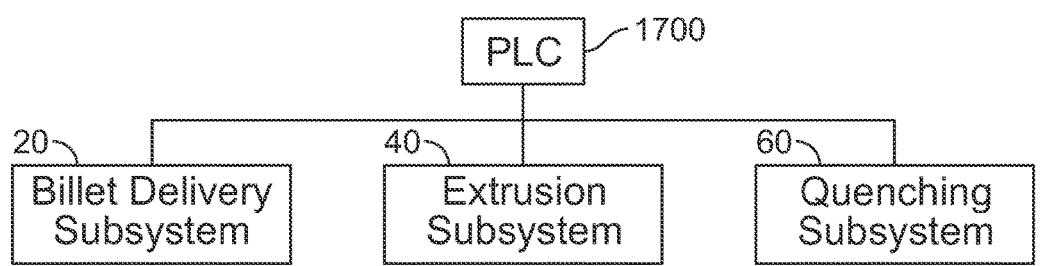
FIG. 37 shows a block diagram of an illustrative computer system for operating the extrusion press system of FIG. 1.

FIG. 37 shows a block diagram of a programmable logic control system for operating the extrusion press system of FIG. 1 according to certain embodiments. As discussed above, the extrusion press system 10 comprises the functional subsystems of a billet delivery subsystem 20, an extrusion subsystem 40, and a cooling or quenching subsystem 60. Operation of certain components in any one or more of these subsystems 20, 40, 60 may be controlled by the PLC system 1700. Various operational steps of the subsystems 20, 40, 60 are described above with reference to process 1200 of FIGS. 33-36.

Instructions for carrying out the methods of this disclosure for extruding a material may be encoded on a machine-readable medium, to be executed by a suitable computer or similar device to implement the methods of the disclosure for programming or configuring PLCs or other programmable devices with a configuration as described above. For example, a personal computer may be equipped with an interface to which a PLC can be connected, and the personal computer can be used by a user to program the PLC using suitable software tools.

Figure 38:
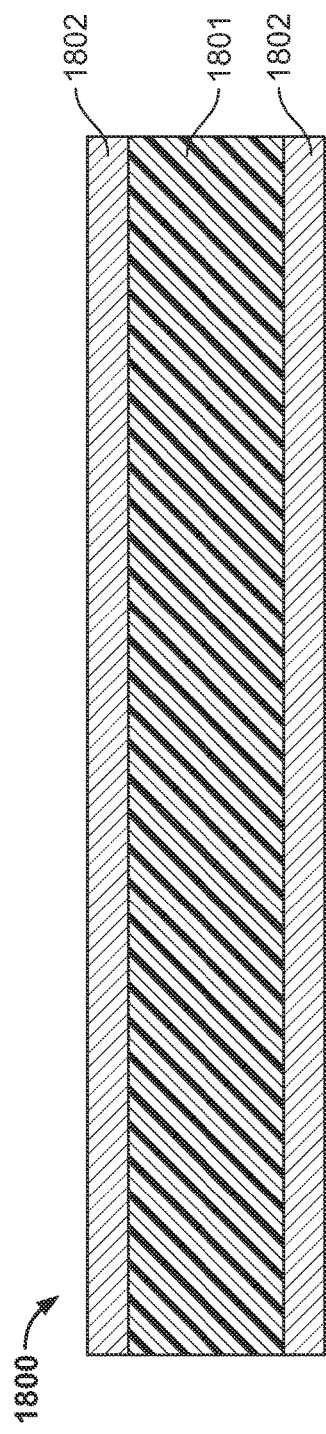
FIG. 38 shows a cross-sectional view of a magnetic data storage medium encoded with a set of machine-executable instructions for performing the methods of the present disclosure.

FIG. 38 shows a cross-section of a magnetic data storage medium 1800 which can be encoded with a machine executable program that can be carried out by systems such as the aforementioned personal computer, or other computers or similar devices. Medium 1800 can be a floppy diskette or hard disk, or magnetic tape, having a suitable substrate 1801, which may be conventional, and a suitable coating 1802, which may be conventional, on one or both sides, containing magnetic domains (not visible) whose polarity or orientation can be altered magnetically. Except in the case where it is magnetic tape, medium 1800 may also have an opening (not shown) for receiving the spindle of a disk drive or other data storage device.

The magnetic domains of coating 1802 of medium 1800 are polarized or oriented so as to encode, in manner which may be conventional, a machine-executable program, for execution by a programming system such as a personal computer or other computer or similar system, having a socket or peripheral attachment into which the PLC to be programmed may be inserted, to configure appropriate portions of the PLC, including its specialized processing blocks, if any, in accordance with the present disclosure.

Figure 39:
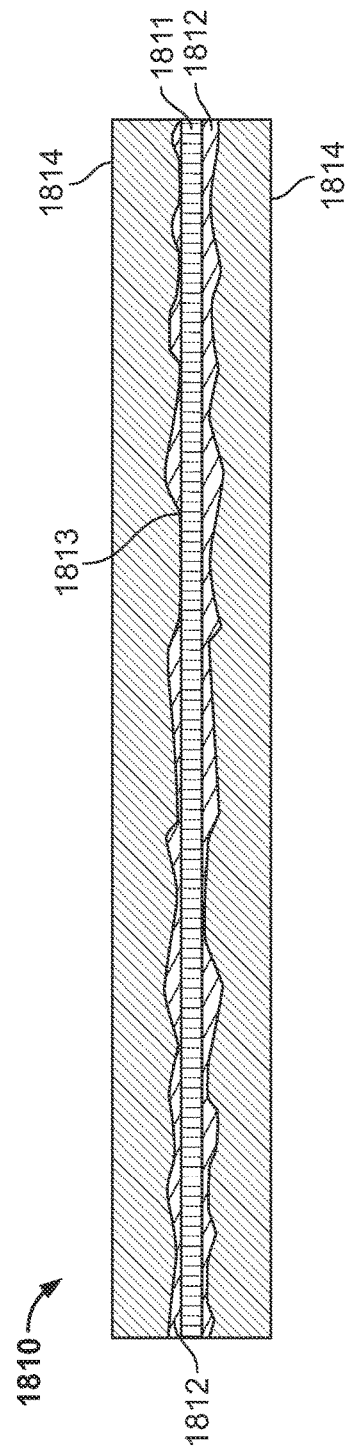
FIG. 39 shows a cross-sectional view of an optically readable data storage medium encoded with a set of machine-executable instructions for performing the methods of the present disclosure.

FIG. 39 shows a cross-section of an optically-readable data storage medium 1810 which also can be encoded with such a machine-executable program, which can be carried out by systems such as the aforementioned personal computer, or other computers or similar devices. Medium 1810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1810 preferably has a suitable substrate 1811, which may be conventional, and a suitable coating 1812, which may be conventional, usually on one or both sides of substrate 1811.

In the case of a CD-based or DVD-based medium, as is well known, coating 1812 is reflective and is impressed with a plurality of pits 1813, arranged on one or more layers, to encode the machine-executable program. The arrangement of pits is read by reflecting laser light off the surface of coating 1812. A protective coating 1814, which preferably is substantially transparent, is provided on top of coating 1812.

In the case of magneto-optical disk, as is well known, coating 1812 has no pits 1813, but has a plurality of magnetic domains whose polarity or orientation can be changed magnetically when heated above a certain temperature, as by a laser (not shown). The orientation of the domains can be read by measuring the polarization of laser light reflected from coating 1812. The arrangement of the domains encodes the program as described above.

Figure 40:
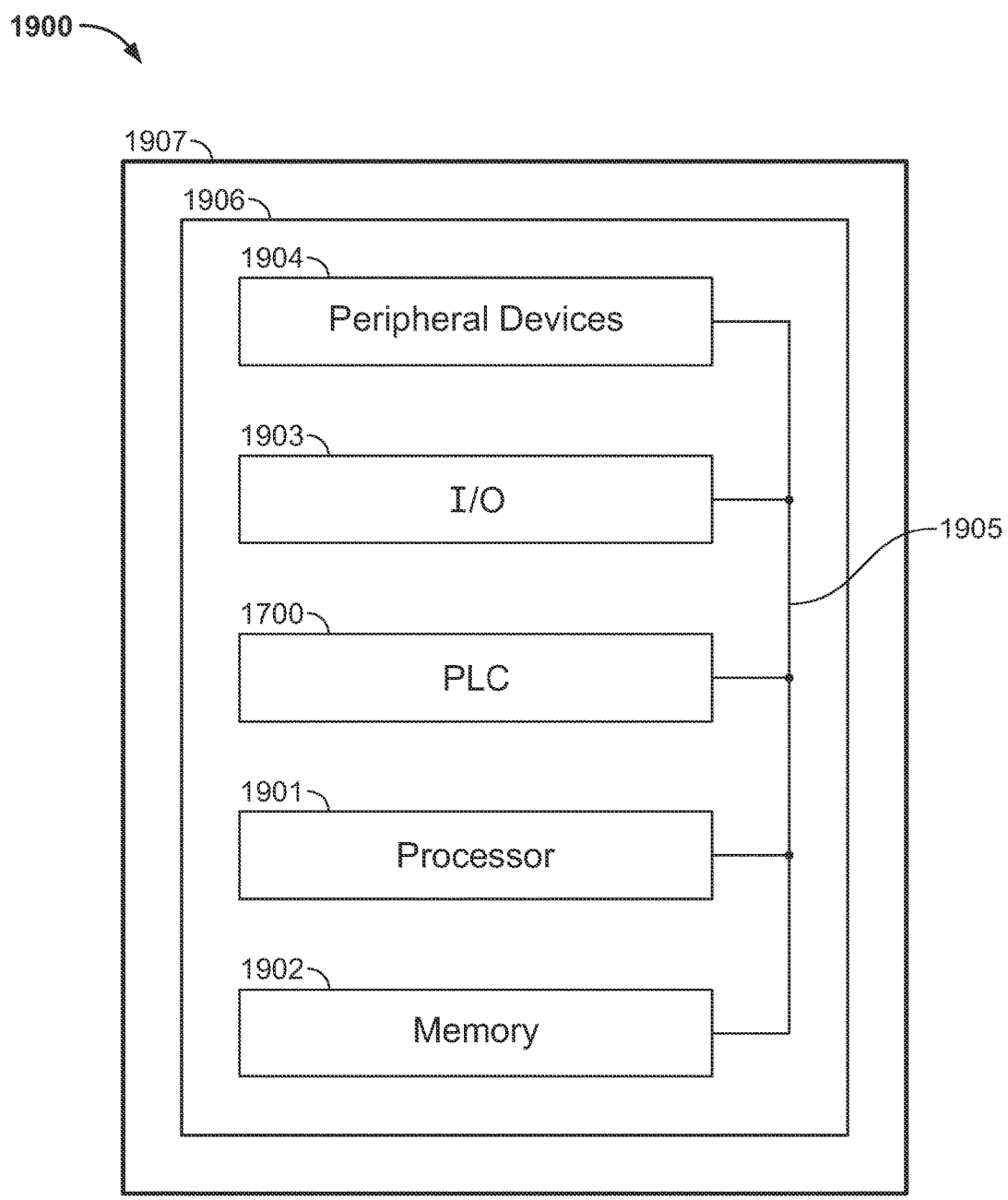
FIG. 40 shows a simplified block diagram of an illustrative system employing a programmable logic controller of the present disclosure.

A PLC 1700 programmed according to the present disclosure may be used in many kinds of electronic devices. One possible use is in a data processing system 1900 shown in FIG. 40. Data processing system 1900 may include one or more of the following components: a processor 1901; memory 1902; I/O circuitry 1903; and peripheral devices 1904. These components are coupled together by a system bus 1905 and are populated on a circuit board 1906 which is contained in an end-user system 1907, which may include a terminal unit 1407 for operating an extrusion press system.

System 1900 can be used in a wide variety of applications, including as instrumentation for an extrusion press system, or any other suitable application where the advantage of using programmable or reprogrammable logic is desirable. PLC 1700 can be used to perform a variety of different logic functions. For example, PLC 1700 can be configured as a processor or controller that works in cooperation with processor 1901. PLC 1700 may also be used as an arbiter for arbitrating access to a shared resources in system 1900. In yet another embodiment, PLC 1700 can be configured as an interface between processor 1901 and one of the other components in system 1900. It should be noted that system 1900 is only exemplary. For example, in certain embodiment a user terminal may be provided near the extrusion press system. In other embodiments, a networked arrangement may be provided that may allow the user terminal to be remote from the extrusion press system.

Figure 41:
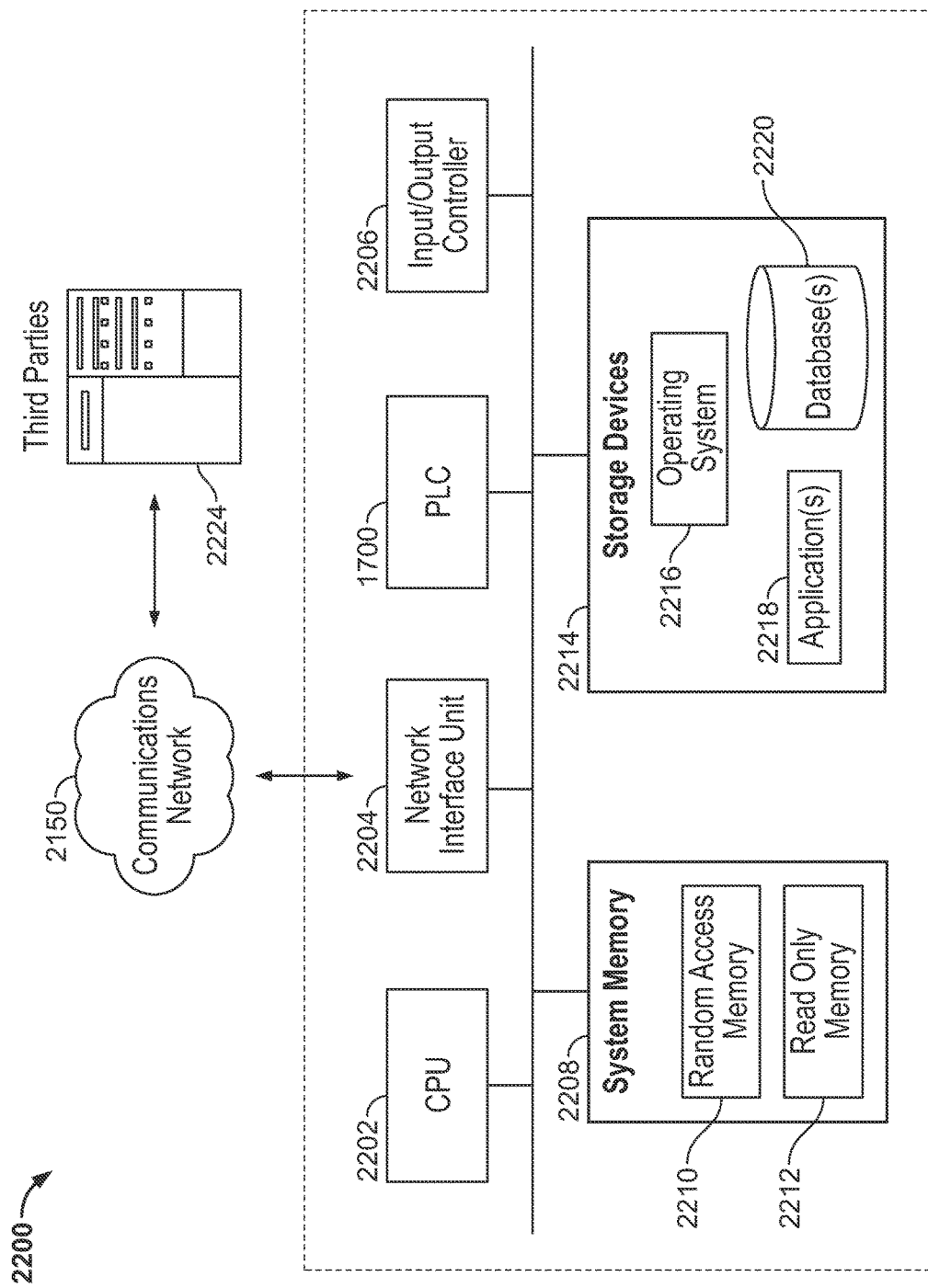
FIG. 41 shows a block diagram of an illustrative system employing a programmable logic controller of the present disclosure.

FIG. 41 is a block diagram of a computing device 2200 used for carrying out at least some of the extrusion press logic processing described above according to certain embodiments. The computing device 2200 comprises a PLC system such as PLC 1700, and at least one network interface unit 2204, an input/output controller 2206, system memory 2208, and one or more data storage devices 2214. The system memory 2208 includes at least one random access memory (RAM) 2210 and at least one read-only memory (ROM) 2212. All of these elements are in communication with a central processing unit (CPU) 2202 to facilitate the operation of the computing device 2200. The computing device 2200 may be configured in many different ways. For example, the computing device 2200 may be a conventional standalone computer or alternatively, the functions of computing device 2200 may be distributed across multiple computer systems and architectures. The computing device 2200 may be configured to perform some or all of the extrusion press logic processing described above, or these functions may be distributed across multiple computer systems and architectures. In the embodiment shown in FIG. 23, the computing device 2200 is linked, via communications network 2150 or local area network 2124 to third parties 2224 through the communications network 2150.

The computing device 2200 may be configured in a distributed architecture, where databases and processors are housed in separate units or locations. The computing device 2200 may also be implemented as a server located either on site at the extrusion press facility or external to the extrusion press facility. Some such units perform primary processing functions and contain at a minimum a general controller or a processor 2202 and a system memory 2208. In such an embodiment, each of these units is attached via the network interface unit 2204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 2202 comprises a processor, such as one or more conventional microprocessors, and one or more supplementary co-processors, such as math co-processors, for offloading workload from the CPU 2202. The CPU 2202 is in communication with the network interface unit 2204 and the input/output controller 2206, through which the CPU 2202 communicates with other devices such as other servers, user terminals, or devices. The network interface unit 2204 and/or the input/output controller 2206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 2202 is also in communication with the data storage device 2214. The data storage device 2214 may comprise an appropriate combination of magnetic, optical and/or semiconductor memory, and may include, for example, RAM, ROM, flash drive, an optical disc such as a compact disc and/or a hard disk or drive. The CPU 2202 and the data storage device 2214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 2202 may be connected to the data storage device 2214 via the network interface unit 2204.

The CPU 2202 may be configured to perform one or more particular processing functions. For example, the computing device 2200 may be configured, via the PLC, for controlling at least in part one or more aspects of the billet delivery subsystem 20, extrusion subsystem 40, and quenching subsystem 60.

The data storage device 2214 may store, for example, (i) an operating system 2216 for the computing device 2200; (ii) one or more applications 2218 (e.g., computer program code and/or a computer program product) adapted to direct the CPU 2202 in accordance with the present invention, and particularly in accordance with the processes described in detail with regard to the CPU 2202; and/or (iii) database(s) 2220 adapted to store information that may be utilized to store information required by the program.

The operating system 2216 and/or applications 2218 may be stored, for example, in a compressed, an uncompiled and/or an encrypted format, and may include computer program code. The instructions of the program may be read into a main memory of the processor from a computer-readable medium other than the data storage device 2214, such as from the ROM 2212 or from the RAM 2210. While execution of sequences of instructions in the program causes the CPU 2202 to perform the process steps described herein, hard-wired circuitry may be used in place of, or in combination with, software instructions for implementation of the processes of the present invention.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 2202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The foregoing is merely illustrative of the principles of the disclosure, and the systems, devices, and methods can be practiced by other than the described embodiments, which are presented for purposes of illustration and not of limitation. It is to be understood that the systems, devices, and methods disclosed herein, while shown for use in extrusion press systems, may be applied to systems, devices, and methods to be used in other manufacturing processes including, but not limited to, cast-and-roll and heat treatment processes. Furthermore, the disclosure could be implemented as a post-processing step of another manufacturing process, including other extrusion processes, or could be implemented concurrently with another manufacturing process.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

What is claimed is:

1. An extrusion press system comprising:
    a mandrel bar having a first end and a second end, the first end for receiving a billet having a hole therethrough and the second end coupled to a mandrel bar tip;
    a plurality of cooling elements configured to be clamped to the mandrel bar, each of the plurality of cooling elements having a respective port through which cooling fluid is delivered into an interior of the mandrel bar for cooling the mandrel bar tip, wherein at any given time at least one but fewer than all of the plurality of cooling elements are clamped to the mandrel bar;
    a plurality of gripping elements configured to grip the mandrel bar, each of the plurality of gripping elements comprising moveable grips for securing in place and preventing rotation of the mandrel bar, wherein at any given time at least one but fewer than all of the plurality of gripping elements are gripping the mandrel bar; and
    a rotating extrusion die configured to receive the billet from a centering insert having a frictional surface that frictionally engages the billet to prevent the billet from rotating prior to entry of the billet into the rotating extrusion die;
    wherein the mandrel bar tip is positioned within the rotating die.

2. The extrusion press system of claim 1, further comprising:
    a press-ram element having moveable first and second arms that together grip the billet and provide a substantially constant pushing force toward the rotating die.

3. The extrusion press system of claim 2, wherein the substantially constant pushing force causes the billet to enter the rotating die at a predetermined rate.

4. The extrusion press system of claim 1, wherein the mandrel bar comprises an opening proximate to the respective port of a respective cooling element of the plurality of cooling elements when the respective cooling element of the plurality of cooling elements is clamped to the mandrel bar, which opening receives the cooling fluid.

5. The extrusion press system of claim 4, wherein the mandrel bar further comprises notches about the mandrel bar on either side of the opening, wherein the notches are configured to receive an o-ring to substantially prevent the cooling fluid from leaking.

6. The extrusion press system of claim 5, further comprising a mandrel bar sleeve about the opening that substantially prevents the cooling fluid from leaking.

7. The extrusion press system of claim 1, wherein the mandrel bar comprises an inner tube therein that receives the cooling fluid from a respective cooling element of the plurality of cooling elements when the respective cooling element of the plurality of cooling elements is clamped to the mandrel bar and through which the cooling fluid is delivered to the mandrel bar tip.

8. The extrusion press system of claim 7, wherein the cooling fluid is returned to the respective cooling element of the plurality of cooling elements from the mandrel bar tip along a space within the mandrel bar between an outer surface of the inner tube and an inner surface of the mandrel bar.

9. The extrusion press system of claim 1, wherein the cooling fluid is water.

10. The extrusion press system of claim 1, wherein the mandrel bar comprises a grip portion that is correspondingly shaped to mate with at least one of the moveable grips of the at least one of the plurality of gripping elements.

11. The extrusion press system of claim 1, further comprising a track along which the billet is transported, wherein the track intermittently moves depending on a position of the billet relative to the plurality of gripping elements and the plurality of cooling elements.

12. The extrusion press system of claim 11, further comprising upper rolling wheels located above the track and configured to contact an upper surface of the billet.

13. The extrusion press system of claim 1, further comprising a quench tube provided at an exit of the rotating extrusion die.

14. The extrusion press system of claim 13, wherein the quench tube quenches extruded material when the extruded material exits the rotating extrusion die.

15. The extrusion press system of claim 14, wherein the extruded material is quenched using water.

16. The extrusion press system of claim 15, wherein the water contacts the extruded material within approximately 1 inch of the rotating extrusion die.

17. The extrusion press system of claim 1, further comprising a motor coupled to a spindle that controls the rotation speed of the rotating extrusion die.

* * * * *